(12) United States Patent
Fiorentino et al.

(10) Patent No.: US 7,844,649 B2
(45) Date of Patent: Nov. 30, 2010

(54) OPTICAL-BASED, SELF-AUTHENTICATING QUANTUM RANDOM NUMBER GENERATORS

(75) Inventors: Marco Fiorentino, Mountain View, CA (US); William J. Munro, Bristol (GB); Raymond G. Beausoleil, Redmond, WA (US); Sean Spillane, Mountain View, CA (US); Charles Santori, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1256 days.

(21) Appl. No.: 11/407,513

(22) Filed: Apr. 20, 2006

(65) Prior Publication Data

US 2007/0260658 A1 Nov. 8, 2007

(51) Int. Cl.
    G06F 7/58 (2006.01)

(52) U.S. Cl. ..................................................... 708/255
(58) Field of Classification Search .......... 708/250–256
     See application file for complete search history.

(56) References Cited

U.S. PATENT DOCUMENTS

| 2005/0071400 | A1* | 3/2005 | Ribordy et al. ............. 708/250 |
| 2006/0280509 | A1* | 12/2006 | Tomaru et al. ............. 398/188 |
| 2007/0182968 | A1* | 8/2007 | Nishioka et al. ............ 356/491 |

FOREIGN PATENT DOCUMENTS

| JP | 2003 036168 | 2/2003 |
| WO | WO 02/091147 | 11/2002 |

OTHER PUBLICATIONS

Haruhito Shimizu et al—"Highly Practical Fiber Squeezer Polarization Controller"—Journal of Lightwave Technology vol. 9 No. 10 Oct. 1, 1999—pp. 1217-1223.
Jennewein T et al—"Quantum Noise and Quantum Communication"—Proceedings of the SPIE vol. 5468 No. 1 Dec. 31, 2003 pp. 1-9.
Soubusta J et al—"Quantum Random Numuber Generator"—Proceedings of the SPIE vol. 4256 2001—pp. 54-60.
B Barak et al—"True Random Number Generators Secure in a Changing Environment"—5th Int'l Workshop Cryptographic Hardware and Embedded Systems—vol. 2779—Sep. 8, 2003—pp. 166-180.

(Continued)

Primary Examiner—Tan V Mai

(57) ABSTRACT

Various embodiments of the present invention are directed optical-based quantum random number generators. In one embodiment, a quantum random number generator includes an input state generator that generates a first optical quantum system and a second optical quantum system in an entangled state, a detector that measures the state of the first optical quantum system and the state of the second optical quantum system, and a system control that evaluates a result obtained from measuring the state of the first optical quantum system and state of the second optical quantum system to determine whether or not to append a number associated with the result to the sequence of random numbers. The quantum random number generator also include state controllers, located between the input state generator and the detector, that are operationally controlled by the system control to maintain the entangled state, based on results obtained from previous measurements performed on the first and second optical quantum systems.

15 Claims, 20 Drawing Sheets

OTHER PUBLICATIONS

Daniel F V James et al—"Measurement of qubits"—Physical Review A vol. 64 No. 5 (2001)—pp. 52312-1.

Hewlett-Packard Development Company, L.P., EP 07755829.4-1229 (co-pending application), Nov. 25, 2009 examination report issued by EPO.

Hewlett-Packard Development Company, L.P., KR 2008-7025644 (co-pending application), English Translation of Nov. 25, 2009 Notice of Preliminary Rejection issued by KIPO.

* cited by examiner

OPTICAL-BASED, SELF-AUTHENTICATING QUANTUM RANDOM NUMBER GENERATORS

TECHNICAL FIELD

The present invention relates to random number generators, and, in particular, to methods and systems for generating a sequence of random numbers using properties of optical quantum systems.

BACKGROUND OF THE INVENTION

Random numbers have applications in numerous areas including game playing, statistical sampling, evaluating integral equations, particle transport calculations, and computations in statistical physics, just to name a few. As a result, random number generators ("RNGs") figure prominently in methods and systems that use random numbers. For example, RNGs are key components of secure systems and are used extensively to generate keys for cryptography. An ideal RNG generates numbers which cannot be predicted in advance and cannot be reliably reproduced. In other words, RNGs ideally generate a sequence of unbiased random numbers. However, many commonly used RNGs either generate sequences of seemingly random numbers or may be susceptible to generating biased sequences of numbers.

RNGs have been implemented in software to generate sequences of seemingly random numbers using formulas and/or numerical methods. Software-based RNGs are referred to as "pseudorandom number generators," because the formulas allow for prediction and reproduction of a sequence of pseudorandom numbers, provided the same initial parameters are used. A recursive Lehmer pseudorandom number generator ("LPNG") is an example of a commonly used pseudorandom number generator given by:

$$x_{n+1} = Ax_n + C (\mod M)$$

where $x_n$ is the nth number of a sequence of random numbers; and

A, C, and M are parameters that can be adjusted to ensure that a sequence of numbers generated by the LPNG appears random.

Typically, M is assigned the word size of a computer employed to compute a sequence of pseudorandom numbers, and $x_0$, the seed, is assigned a prime number. For example, assigning A, C, and M the values 21, 1, and 32 (5 bits), respectively, and assigning $x_0$ the prime number 13, the LPNG generates a sequence of pseudorandom integers 13, 18, 27, 24, 25, 14, 7, etc. Alternative approaches may seed a pseudorandom number generator with the time produced by a computer-system clock each time the pseudorandom number generator is initiated. However, even using the time provided by a system clock is not infallible because one can determine the time when the pseudorandom number generator was initiated.

Hardware-based RNGs have also been developed to generate sequences of random numbers from chaotic fluctuations observed in thermal noise generated by atomic, molecular, and electrical systems. For example, thermal noise is generated by an electric current flowing through an electrical conductor, which can be used as a source of a sequence of random numbers by measuring voltage equilibrium fluctuations. The thermal noise occurs whether or not there is an applied voltage because of random motion of electrons in the conductor. However, hardware-based RNGs are not always reliable sources of sequences of random numbers because the systems employed by the hardware-based RNGs are susceptible to environmental changes. For example, an electric noise-based RNG used to generate a sequence of random numbers can be biased by changing the temperature of the system. In addition, the methods typically employed to authenticate the randomness of the sequence generated by a hardware-based RNG are deterministic software based methods that can be used to determine whether the sequences are statistically well-behaved but cannot evaluate the randomness of the sequence.

Another type of RNG, called a "quantum random number generator" ("QRNG"), is based on quantum-mechanical properties of quantum systems. QRNGs are typically employed to generate random numbers by performing measurements on identical quantum systems. Each measurement projects the state of each quantum system onto one of many possible states at the time a measurement is performed. The state determined by the measurement is associated with a number. A number generated in this manner is truly random, because, according to the standard interpretation of quantum mechanics, no amount of refinement of the measurement methods and systems can overcome this uncertainty. As a result, QRNGs are highly desirable systems for generating sequences of random numbers.

Quantum systems comprising just two discrete states, represented by "$|0\rangle$" and "$|1\rangle$," can be used to implement QRNGs. Examples of two-state quantum systems include any two photon, or energy, states of an electromagnetic field, vertical and horizontal polarization states of an electromagnetic field, and the two spin states of an electron or some atomic nuclei. A quantum system with two discrete states is called a "qubit system," and the states $|0\rangle$ and $|1\rangle$, called "qubit basis states," can also be represented in set notation as $\{|0\rangle, |1\rangle\}$. A qubit system can exist in the state $|0\rangle$, the state $|1\rangle$, or in any of an infinite number of states that simultaneously comprise both $|0\rangle$ and $|1\rangle$. Any of the states that include both $|0\rangle$ and/or $|1\rangle$ can be represented mathematically as a linear superposition of states:

$$|\psi\rangle = \alpha|0\rangle + \beta|1\rangle$$

The state $|\psi\rangle$ is called a "qubit," and the parameters $\alpha$ and $\beta$ are complex-valued coefficients satisfying the condition:

$$|\alpha|^2 + |\beta|^2 = 1$$

When $|0\rangle$ and $|1\rangle$ are the two possible states determined by a measurement performed on the qubit system in the state $|\psi\rangle$, one has a probability $|\alpha|^2$ of finding the qubit system in the state $|0\rangle$ and a probability $|\beta|^2$ of finding the qubit system in the state $|1\rangle$. One is said to be performing a measurement on the qubit system in the basis $\{|0\rangle, |1\rangle\}$.

The infinite number of states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where $0 \leq \theta < \pi$, and $0 \leq \phi < 2\pi$.

FIG. 1 illustrates a Bloch sphere representation of a qubit system. As shown in FIG. 1, lines 101-103 are orthogonal x, y, and z Cartesian coordinate axes, respectively, and a Bloch sphere 106 is centered at the origin. There are an infinite number of points on the Bloch sphere 106, each point representing a unique state of a qubit system. For example, a point 108 on the Bloch sphere 106 represents a unique state of a qubit system that simultaneously comprises, in part, the state $|0\rangle$ and, in part, the state $|1\rangle$. However, once the state of the qubit system is measured in the basis $\{|0\rangle,|1\rangle\}$, the state of the qubit system is projected onto the state $|0\rangle$ 110 or onto the state $|1\rangle$ 112.

FIG. 2 illustrates a hypothetical single polarizing beamsplitter-based QRNG 200. The QRNG 200 comprises a polarizing beamsplitter 202, two photon detectors 204 and 206, and a photon source 208. The beamsplitter 202 comprises a multilayer dielectric thin film 210 sandwiched between two prisms 212 and 214. The beamsplitter 202 has an input channel 216 and two output channels 218 and 220. The channels 216, 218, and 220 represent either optical fibers or free space. The beamsplitter 202 reflects vertically polarized electromagnetic radiation and transmits horizontally polarized electromagnetic radiation. The photon source 208 outputs a single photon of electromagnetic radiation in an unbiased, coherent linear superposition of states:

$$|\chi\rangle = \frac{1}{\sqrt{2}}|V\rangle + \frac{1}{\sqrt{2}}|H\rangle$$

where $|V\rangle$ represents a vertical polarization state of the photon; and $|H\rangle$ represents a horizontal polarization state of the photon.

The vertical and horizontal polarization states, $|V\rangle$ and $|H\rangle$, are orthogonal basis states of the single photon quantum system. The photon remains in the state $|\chi\rangle$ until the photon is detected at either the photon detector $D_1$ 204 or the photon detector $D_2$ 206. The square of the coefficients of the state $|\chi\rangle$ indicates that there is a ½ probability of detecting the photon at the detector $D_1$ 204 and a ½ probability of detecting the photon at the detector $D_2$ 206. As a result, detection of the photon at either photon detector is a random event.

The QRNG 200 can be used to generate a sequence of random binary numbers which can be partitioned into a sequence of random n-bit words. The sequence of random n-bit words can be used in a variety of random-number applications. For example, the QRNG 200 can be used to generate a sequence of random integers between 0 and 31 as follows. When a photon is detected by the detector $D_2$ 206, the binary number "1" is added to a sequence of binary numbers, and when a photon is detected by the detector $D_1$ 204, the binary number "0" is added to the same sequence of binary numbers. Suppose that generating the state $|\chi\rangle$ 30 times generates the following sequence of random binary numbers:

000110101011100101010111100100

The sequence of random binary numbers can be partitioned into 5-bit words to give a random sequence of base 2 numbers 00011, 01010, 11100, 10101, 01111, and 00100, which can then be translated into a corresponding sequence of random base 10 integers 3, 10, 28, 21, 15, and 4, respectively.

Although the QRNG 200 appears to offer a convenient method and system for generating a sequence of random numbers, the QRNG 200 may be susceptible to generating sequences of pseudorandom numbers by tampering with the photon source 208. For example, an adversary with control of the photon source 208 can bias the photon source 208 to output photons represented by the state:

$$|\chi\rangle = \frac{1}{\sqrt{3}}|V\rangle + \sqrt{\frac{2}{3}}|H\rangle$$

As a result, the QRNG 200 generates biased sequences of binary numbers with approximately ⅔ of the binary numbers equal to "1" and approximately ⅓ of the binary numbers equal to "0." Moreover, the methods typically employed to authenticate the randomness of a sequence generated by a device, such as the QRNG 200, are often deterministic software based methods, which as described above are not true RNGs and, therefore, are reliable for authenticating the randomness of a sequence. Physicists, cryptographers, computer scientists, and quantum-information users have recognized a need for QRNGs that can reliably generate sequences of random numbers, and can also detect, authenticate, and correct biases in the sequences of random numbers using methods that rely on the non-deterministic properties of quantum systems.

SUMMARY OF THE INVENTION

Various embodiments of the present invention are directed to methods and systems for generating random numbers using a quantum random number generator. In one embodiment of the present invention, a quantum random number generator includes an input state generator that generates a first optical quantum system and a second optical quantum system in an entangled state, a detector that measures the state of the first optical quantum system and the state of the second optical quantum system, and a system control that evaluates a result obtained from measuring the state of the first optical quantum system and state of the second optical quantum system to determine whether or not to append a number associated with the result to the sequence of random numbers. The quantum random number generator may also include state controllers, located between the input state generator and the detector, that are operationally controlled by the system control to maintain the entangled state, based on results obtained from previous measurements performed on the first optical quantum system and the second optical quantum system.

DETAILED DESCRIPTION OF THE INVENTION

Figure 1:
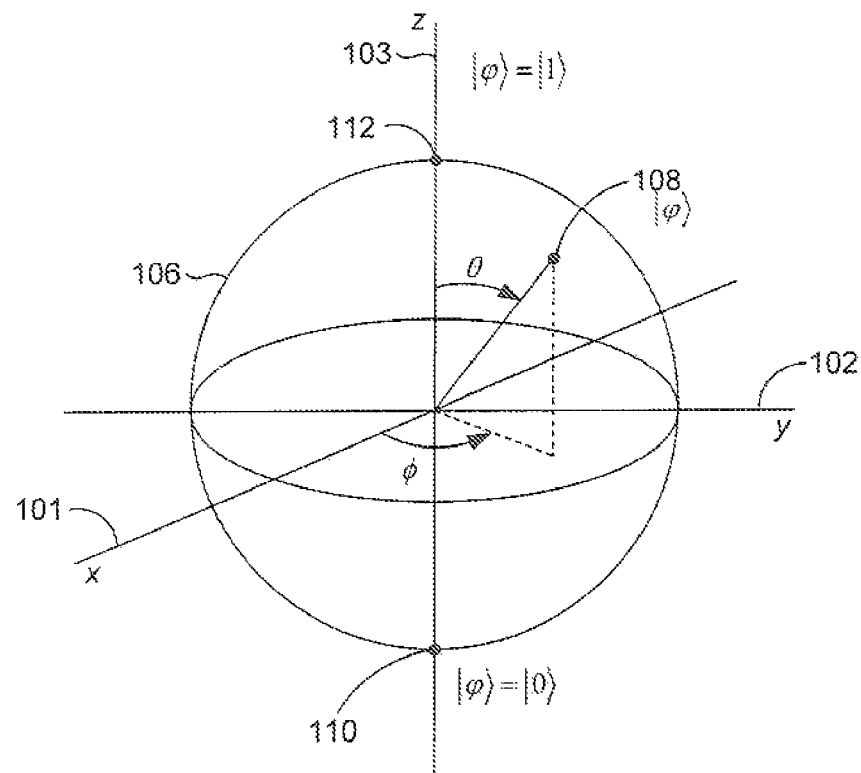
FIG. 1 illustrates a Bloch sphere representation of a qubit system.
Figure 2:
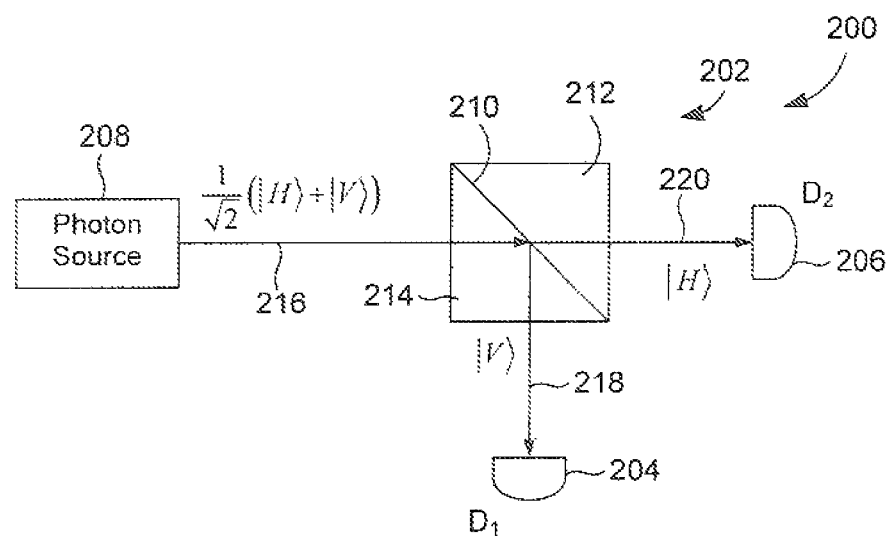
FIG. 2 illustrates a hypothetical single polarizing beamsplitter-based quantum random number generator.

Various embodiments of the present invention are directed to optical-based, self-authenticating QRNGs that can be used to generate a sequence of random binary numbers. Embodiments of the present invention include quantum-mechanical-based methods for evaluating and authenticating the randomness of the sequence and for removing biased binary numbers. Embodiments of the present invention are mathematical in nature and, for this reason, are described below with reference to numerous equations and numerous graphical illustrations. Although mathematical expressions, alone, may be sufficient to fully describe and characterize embodiments of the present invention to those skilled in the art of quantum optics and quantum information, the more graphical, problem oriented examples, and control-flow-diagram approaches included in the following discussion are intended to illustrate various embodiments of the present invention in a variety of different ways so that the present invention may be accessible to readers with various backgrounds. Also, in order to assist the reader in understanding descriptions of various embodiments of the present invention, overview subsections of related topics in physics are provided. In a first subsection, an overview of quantum mechanics is provided. An overview of electromagnetic radiation and quantum optics is provided in a second subsection. An overview of quantum entanglement is provided in a third subsection. An overview of polarization states and Stokes parameters is provided in a fourth subsection. Finally, various system and method embodiments of the present invention are described in a fifth subsection.

Overview of Quantum Mechanics

Embodiments of the present invention employ concepts in quantum mechanics. The textbook "Quantum Mechanics, Vol. I and II," by Claude Cohen-Tannoudji, Bernard Diu and Frank Laloe, Hermann, Paris, France, 1977, is one of many references for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior, atomic and subatomic levels, of systems comprising photons, electrons, atoms, and molecules. Quantum systems exist in discrete states that are characterized by discrete measurable quantities. A state of a quantum system is represented by a ket and is denoted $|\Psi\rangle$, where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546 \times 10^{-34}$ Js. The spin state that corresponds to the spin-angular momentum $\hbar/2$ is referred to as "spin up" and is denoted $|\uparrow\rangle$, and the spin state that corresponds to the spin angular momentum $-\hbar/2$ is referred to as "spin down" and is denoted $|\downarrow\rangle$. Various different labels can be assigned to various different quantum states. For example, the spin up and spin down states $|\uparrow\rangle$ and $|\downarrow\rangle$ can also be represented by the kets $|\frac{1}{2}\rangle$ and $|-\frac{1}{2}\rangle$, respectively. Also, a single label can be used to represent different states in entirely different quantum systems. For example, the ket "$|1\rangle$" can represent a first quantized vibrational level of a diatomic molecule and can also be used to represent a single photon, as described below, in a following subsection.

A measurement employed to determine a measurable quantity of a quantum system, such as the spin angular momentum of an electron, is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where
  i is a non-negative integer, and
  $\psi_i$ is a real value, called an "eigenvalue," that corresponds to a discrete measurable quantity that is observed when the quantum system is in the eigenstate $|\psi_i\rangle$.

For example, a measurement employed to determine the spin angular momentum of an electron parallel to the z-axis is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and}$$

$$\hat{S}_z|\downarrow\rangle = -\frac{\hbar}{2}|\downarrow\rangle$$

The eigenstates of an operator are complex vectors that span a complex vector space called a "state space." The eigenstates constitute a basis of the vector space if every state belonging to the state space has a unique linear superposition on the basis. For example, a state $|\Psi\rangle$ in a state space spanned by the N eigenstates $\{|\psi_i\rangle\}$ of an operator $\hat{\Psi}$ the can be written as a linear superposition of the eigenstates as follows:

$$|\Psi\rangle = \sum_{i=1}^{N} c_i |\psi_i\rangle$$

where $c_i$ is a complex valued coefficient called the "amplitude." The state space associated with an operator is also called a "Hilbert space." A Hilbert space includes a mathematical operation called the "inner product." The inner product of two states $|\Psi\rangle$ and $|\Xi\rangle$ is represented by:

$$\langle\Xi|\Psi\rangle$$

where $\langle\Xi|$ is called a "bra," and represents the complex conjugate and transpose of the state $|\Xi\rangle$. The inner product has the following property:

$$\langle\Xi|\Psi\rangle = \langle\Psi|\Xi\rangle^*$$

where "*" represents the complex conjugate. The basis eigenstates of a Hilbert space are orthonormal, or in mathematical notation:

$$\langle\psi_i|\psi_j\rangle = \delta_{ij}$$

where $\delta_{ij}$ is 1 when i equals j, and 0 otherwise. For example, the inner product of the eigenstates of a single electron Hilbert space are:

$$\langle\uparrow|\uparrow\rangle = \langle\downarrow|\downarrow\rangle = 1, \text{ and}$$

$$\langle\uparrow|\downarrow\rangle = \langle\downarrow|\uparrow\rangle = 0$$

The orthonomality property of the eigenstates of a Hilbert space can be used to determine the coefficients of the linear superposition of states $|\Psi\rangle$. Taking the inner product of $|\Psi\rangle$ with $\langle\psi_j|$ gives the corresponding coefficient:

$$\langle\psi_j|\Psi\rangle = \sum_{i=1}^{N} c_i \langle\psi_j|\psi_i\rangle = \sum_{i=1}^{N} c_i \delta_{ij} = c_j$$

Substituting for the coefficients in the linear superposition gives:

$$|\Psi\rangle = \sum_{i=1}^{N} |\psi_i\rangle\langle\psi_i|\Psi\rangle$$

Because $|\Psi\rangle$ is an arbitrary ket in the Hilbert space, $$\sum_{i=1}^{N} |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

The eigenstates of an operator can be represented by orthogonal normalized column vectors and the operator can be represented by a square matrix. For example, the eigenstates of a single electron Hilbert space associated with the operator $\hat{S}_z$ are represented by the column vectors:

$$|\uparrow\rangle \square \begin{bmatrix} 1 \\ 0 \end{bmatrix}, \text{ and } |\downarrow\rangle \square \begin{bmatrix} 0 \\ 1 \end{bmatrix}$$

where the symbol "$\square$" stands for "is represented by." The transposed complex conjugates of the eigenstates are represented by the row vectors:

$$\langle\uparrow| \square [1\ 0], \text{ and } \langle\downarrow| \square [0\ 1]$$

Using the completeness relation, an operator $\hat{O}$ on the basis $\{|\psi_i\rangle\}$ can also be represented by:

$$\hat{O} = \sum_{i=1}^{N} \sum_{j=1}^{N} |\psi_i\rangle\langle\psi_i|\hat{O}|\psi_j\rangle\langle\psi_j|$$

where $\langle\psi_i|\hat{O}|\psi_j\rangle$ is a matrix element. The matrix corresponding to the operator $\hat{O}$ on the basis $\{|\psi_i\rangle\}$ can be represented as follows:

$$\hat{O} \square \begin{bmatrix} \langle\psi_1|\hat{O}|\psi_1\rangle & \langle\psi_1|\hat{O}|\psi_2\rangle & \cdots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \cdots & & \langle\psi_N|\hat{O}|\psi_N\rangle \end{bmatrix}$$

The matrix representation of the operator $\hat{O}$ equal to $\hat{\Psi}$ has zero off diagonal elements, and the diagonal elements are the eigenvalues $\{\psi_i\}$. For example, the electron spin z-axis operator can be given by:

$$\hat{S}_z = \frac{\hbar}{2}\hat{\sigma}_z$$

where $$\hat{\sigma}_z = |\uparrow\rangle\langle\uparrow| - |\downarrow\rangle\langle\downarrow|.$$

The matrix representation of the electron spin operator $\hat{S}_z$ is given by:

$$\hat{S}_z \equiv \begin{bmatrix} \langle\uparrow|\hat{S}_z|\uparrow\rangle & \langle\uparrow|\hat{S}_z|\downarrow\rangle \\ \langle\downarrow|\hat{S}_z|\uparrow\rangle & \langle\downarrow|\hat{S}_z|\downarrow\rangle \end{bmatrix} = \frac{\hbar}{2}\begin{bmatrix} 1 & 0 \\ 0 & -1 \end{bmatrix}$$

An operator $\hat{O}$ is called a "Hermitian operator" if $$\hat{O} = \hat{O}^\dagger$$

The corresponding matrix elements satisfy the condition:

$$\langle\psi_i|\hat{O}|\psi_j\rangle = \langle\psi_j|\hat{O}^\dagger|\psi_i\rangle$$

Prior to a measurement corresponding to an operator $\hat{\Psi}$, a quantum system can be thought of an simultaneously existing in all of the eigenstates $\{|\psi_i\rangle\}$ of a the operator $\hat{\Psi}$, which is represented by the (pure state) linear superposition of states:

$$|\Psi\rangle = \sum_{i=1}^{N} c_i |\psi_i\rangle = \sum_{i=1}^{N} |\psi_i\rangle\langle\psi_i|\Psi\rangle$$

The measurement corresponding to the operator $\hat{\Psi}$ projects the quantum system initially in the state $|\Psi\rangle$ onto one of the eigenstates $|\psi_i\rangle$. In other words, a measurement on a quantum system is essentially a filtering process that places the state of the quantum system into one of the eigenstates in the linear superposition at the time of the measurement. For example, an electron with an unknown spin orientation prior to a measurement corresponding to the operator $\hat{S}_z$ is represented in a linear superposition of states:

$$|\Psi\rangle = c_1|\uparrow\rangle + c_2|\downarrow\rangle$$

A spin determination measurement $\hat{S}_z$ projects the state of the electron onto either the state $|\uparrow\rangle$ or the state $|\downarrow\rangle$ at the time of the measurement. In other words, just after the spin determination measurement, the electron is either in the state $|\uparrow\rangle$ or the state $|\downarrow\rangle$.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ the state of a quantum system will be projected onto, the probability of the quantum system being found in a particular state $|\psi_i\rangle$ immediately after the measurement is given by:

$$Pr(\psi_i) = |c_i|^2 = |\langle\psi_i|\Psi\rangle|^2$$

where $|\Psi\rangle$ is normalized, and $|c_i|^2$ equals $c_i^* c_i$ and gives the outcome probability. For example, prior to a spin determination measurement in the spin basis $\{|\uparrow\rangle, |\downarrow\rangle\}$, consider an electron coherently prepared with a ½ probability of being found in the spin state $|\uparrow\rangle$ and a ½ probability of being found in the spin state $|\downarrow\rangle$. The state associated with the electron in such as spine state prior to a spin determination measurement can be represented by:

$$|\Psi\rangle = \frac{1}{\sqrt{2}}|\uparrow\rangle + \frac{1}{\sqrt{2}}|\downarrow\rangle$$

The expectation value of a measurement performed on a quantum system that is represented by the linear superposition of states $|\Psi\rangle$ is mathematically represented by:

$$\langle\hat{\Psi}\rangle = \langle\Psi|\hat{\Psi}|\Psi\rangle$$

and is determined by applying the completeness relation as follows:

$$\langle\hat{\Psi}\rangle = \sum_{i=1}^{N}\sum_{j=1}^{N} \langle\Psi|\psi_i\rangle\langle\psi_i|\hat{\Psi}|\psi_j\rangle\langle\psi_j|\Psi\rangle$$

$$= \sum_{i=1}^{N} \psi_i |\langle\psi_i|\Psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states representing each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue obtained from the measurement. For example, the expectation value of $\hat{S}$hd z can be any real value between the eigenvalues $\hbar/2$ and $-\hbar/2$, but the actual measured value of $\hat{S}_z$ for an electron is always either $\hbar/2$ or $-\hbar/2$ in each individual measurement.

The expectation value of a single quantum system in a state $|\Psi\rangle$ can also be described using a density operator defined by:

$$\hat{\rho} = |\Psi\rangle\langle\Psi|$$

where the state $|\Psi\rangle$ is also called a "pure state," which is distinguished from a statistical mixture of states described below. The density operator is represented in the $\{|\psi_i\rangle\}$ basis by a matrix called the "density matrix" whose matrix elements are:

$$\rho_{ij} = \langle\psi_i|\hat{\rho}|\psi_j\rangle = c_i^* c_j$$

The density operator characterizes the state of the quantum system. In other words, the density operator provides all the physical information that can be calculated from the state $|\Psi\rangle$. For example, the sum of the diagonal matrix elements of the density matrix is given by:

$$\sum_i |c_i|^2 = \sum_i \rho_{ii} = Tr(\rho) = 1$$

where Tr represents the trace, or sum of the diagonal elements, of a matrix. For example, the density matrix of a two-state quantum system in the pure state:

$$|\Psi\rangle = c_1|\psi_1\rangle + c_2|\psi_2\rangle$$

is given by:

$$\rho = \begin{bmatrix} c_1 c_1^* & c_1 c_2^* \\ c_2 c_1^* & c_2 c_2^* \end{bmatrix}$$

where the diagonal elements are the probabilities associated with projecting the quantum system into either the state $|\psi_1\rangle$ or the state $|\psi_2\rangle$, and the off-diagonal elements represent the interference effects between the states $|\psi_1\rangle$ and $|\psi_2\rangle$. In addition, the expectation value of a quantum system in the state $|\Psi\rangle$ can be expressed as:

$$\langle \hat{\Psi} \rangle = \sum_{i,j} \langle \psi_j | \Psi \rangle \langle \Psi | \psi_i \rangle \langle \psi_i | \hat{\Psi} | \psi_j \rangle$$
$$= \sum_{i,j} \langle \psi_j | \hat{\rho} | \psi_i \rangle \langle \psi_i | \hat{\Psi} | \psi_j \rangle$$
$$= Tr\{\hat{\rho}\hat{\Psi}\}$$

However, it is often the case that information about a quantum system is incomplete. For example, a quantum system can be in any one of the states $|\Psi_1\rangle, |\Psi_2\rangle, |\Psi_3\rangle, \ldots$, each with an associated probability $p_1, p_2, p_3, \ldots$, where the probabilities satisfy the conditions:

$$0 \leq p_1, p_2, p_3, \ldots \leq 1, \text{ and } \sum_i p_i = 1$$

The quantum system is said to exist in a "statistical mixture of states." The density operator for a statistical mixture of states can be determined as follows. As described above, the probability that a measurement of the observable $\hat{\Psi}$ on a quantum system in the pure state $|\Psi_i\rangle$ yields a result $\psi_n$ is:

$$Pr_i(\psi_n) = \langle \Psi_i | \psi_n \rangle \hbar \langle \psi_n | \Psi_i \rangle = |\langle \psi_n | \Psi_i \rangle \hbar|^2$$

However, the probability $Pr_i(\Psi_n)$ of observing $\Psi_n$ in a statistical mixture of states is weighted by $p_i$ and the summed over i to give:

$$Pr(\psi_n) = \sum_i p_i Pr_i(\psi_n)$$
$$= \sum_i p_i \langle \psi_n | \Psi_i \rangle \langle \Psi_i | \psi_n \rangle$$
$$= \langle \psi_n | \hat{\rho} | \psi_n \rangle$$

where $$\hat{\rho} = \sum_i p_i |\Psi_i\rangle\langle\Psi_i|$$

is the density operator associated with a statistical mixture of states. The associated density matrix elements are given by:

$$\rho_{np} = \langle \psi_n | \sum_i p_i |\Psi_i\rangle\langle\Psi_i| | \psi_p \rangle$$
$$= \sum_i p_i c_n^{(i)} c_p^{(i)*}$$

The physical meaning of the density matrix is described for a two-state quantum system comprising a mixture of states:

$$|\Psi_i\rangle = c_1^{(i)}|\psi_1\rangle + c_2^{(i)}|\psi_2\rangle$$

The corresponding density matrix is given by:

$$\rho = \begin{bmatrix} \rho_{11} & \rho_{12} \\ \rho_{21} & \rho_{22} \end{bmatrix} = \begin{bmatrix} \sum_i p_i c_1^{(i)} c_1^{(i)*} & \sum_i p_i c_1^{(i)} c_2^{(i)*} \\ \sum_i p_i c_2^{(i)} c_1^{(i)*} & \sum_i p_i c_2^{(i)} c_2^{(i)*} \end{bmatrix}$$

The diagonal matrix elements can be interpreted to mean that when the state of the quantum system is $|\Psi_i\rangle$, the diagonal matrix element $\rho_{11}$ represents the average probability of finding the quantum system in the state $|\psi_1\rangle$, and the diagonal matrix element $\rho_{22}$ represents the average probability of finding the quantum system in the state $|\psi_2\rangle$. When the same measurement is carried out N times under identical conditions, $N\rho_{11}$ will be found in the state $|\psi_1\rangle$ and $N\rho_{22}$ will be found in the state $|\psi_2\rangle$. The off-diagonal elements $\rho_{12}$ and $\rho_{21}$ express the average interference effects between the states $|\psi_1\rangle$ and $|\psi_2\rangle$. Note that unlike the diagonal matrix elements, the off-diagonal matrix elements can be zero even though neither of the products $c_1^{(i)}c_2^{(i)*}$ and $c_2^{(i)}c_1^{(i)*}$ is zero, which means that the average over N measurements has cancelled out the interference effects of the states $|\psi_1\rangle$ and $|\psi_2\rangle$.

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol $\otimes$ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi} \otimes \hat{\Xi})(|\psi\rangle \otimes |\xi\rangle) = (\hat{\Psi}|\psi\rangle) \otimes (\hat{\Xi}|\xi\rangle)$$

where $|\psi\rangle$ represents a state in the Hilbert space $H_\Psi$, and $|\xi\rangle$ represents a state in the Hilbert space $H_\Xi$. The tensor product $|\psi\rangle \otimes |\xi\rangle$ can be abbreviated as $|\psi\rangle|\xi\rangle$, $|\psi,\xi\rangle$ or $|\psi\xi\rangle$. For example, the spin states of two electrons in an atomic orbital are bases for a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle_1 \otimes |\uparrow\rangle_2 = |\uparrow\rangle_1|\uparrow\rangle_2 = |\uparrow,\uparrow\rangle_{12} = |\uparrow\uparrow\rangle_{12}$$

where the subscripts 1 and 2 refer to the first and second electrons.

In quantum mechanics, there are also measurable quantities with continuous eigenvalue spectrums. The dimensionality of the corresponding Hilbert spaces are infinite and many of the properties described above for discrete quantum systems can be generalized for continuous quantum systems. A continuous eigenvalue equation is:

$$\hat{\zeta}|\zeta\rangle = \zeta|\zeta\rangle$$

where $\zeta$ represents a continuous eigenvalue, and the ket $|\zeta\rangle$ is a continuous eigenstate of the operator $\hat{\zeta}$. For example, for an unbound particle in one dimension, both position q and momentum p are continuous eigenvalues of the position and momentum operators $\hat{q}$ and $\hat{p}$, respectively, and can assume any real value between $-\infty$ and $\infty$.

The properties of the continuous variable $\zeta$ can be generalized as follows:

$$\langle\zeta|\zeta'\rangle = \delta(\zeta-\zeta'),$$

$$\int_{-\infty}^{\infty} d\zeta|\zeta\rangle\langle\zeta| = 1, \text{ and}$$

$$\langle\zeta|\hat{\zeta}|\zeta'\rangle = \zeta'\delta(\zeta-\zeta'),$$

where $\delta(\zeta-\zeta')$ is the delta function, which has numerous limit representations, such as $$\delta(\zeta-\zeta') = \lim_{\Delta \to 0} \frac{1}{\sqrt{2\pi\Delta^2}} \exp\left(-\frac{(\zeta-\zeta')^2}{2\Delta^2}\right)$$

A state ket for an arbitrary physical state can be expanded in terms of the states $\{|\zeta\rangle\}$ as follows:

$$|\alpha\rangle = \int_{-\infty}^{\infty} d\zeta |\zeta\rangle\langle\zeta|\alpha\rangle$$

For example, consider placing in the path of a particle a detector that outputs the position of the particle when the particle is at the position q. Immediately after the measurement is taken, the system, initially in the state $|\alpha\rangle$, is projected onto the state represented by $|q\rangle$ in much the same way an arbitrary electron-spin state is projected onto one of the two spin states when a spin detection measurement is performed. Other properties of the continuous variable $\zeta$ rare given by:

$$\int_{-\infty}^{\infty} d\zeta |\langle\zeta|\alpha\rangle|^2 = 1, \text{ and}$$

$$\langle\beta|\alpha\rangle = \int_{-\infty}^{\infty} d\zeta \langle\beta|\zeta\rangle\langle\zeta|\alpha\rangle$$

The momentum operator $\hat{p}$ can also be represented by a differential operator $-i\hbar\partial/\partial q$. As a result, both the position and momentum operators satisfy the canonical commutation relations:

$$[\hat{q}_i, \hat{q}_j] = 0$$

$$[\hat{p}_i, \hat{p}_j] = 0, \text{ and}$$

$$[\hat{q}_i, \hat{p}_j] = i\hbar\delta_{ij}$$

where
i and j represent orthogonal coordinates, such as the Cartesian x, y, and z coordinates, and
the commutator is defined as [A, B]=AB−BA.

An Overview of Electromagnetic Radiation and Quantum Optics

In this subsection, a brief description of electromagnetic radiation and quantum optics that relates to embodiments of the present invention is described. The textbooks "Quantum Optics," M. O. Scully and M. S. Zubairy, Cambridge University Press, Cambridge, United Kingdom, 1997, and "The Quantum Theory of Light (3rd Edition)," R. Loudon, Oxford University Press, New York, 2000 are two of many references for quantum optics. Additional details can be obtained from the above-referenced textbooks, or from many other textbooks, papers, and journal articles in this field.

Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\vec{E}(\vec{r},t)$ and a magnetic field component $\vec{B}(\vec{r},t)$ that are related in terms of a vector potential $\vec{A}(\vec{r},t)$ satisfying the wave equation:

$$\nabla^2 \vec{A} - \frac{1}{c^2}\frac{\partial^2 \vec{A}}{\partial t^2} = 0$$

and the Coulomb, non-relativistic gauge condition:

$$\nabla \cdot \vec{A}(\vec{r},t) = 0$$

where the electric and magnetic field components are determined by:

$$\vec{E}(\vec{r},t) = -\frac{\partial \vec{A}(\vec{r},t)}{\partial t}, \text{ and}$$

$$\vec{B}(\vec{r},t) = \nabla \times \vec{A}(\vec{r},t)$$

Figure 3:
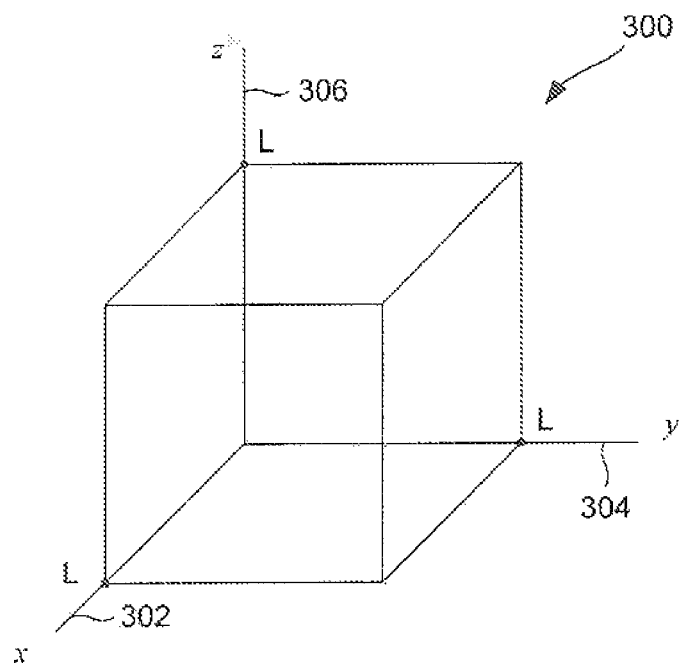
FIG. 3 illustrates a cubic cavity.

The electromagnetic radiation is assumed to be propagating and is subject to periodic boundary conditions imposed by a cubic, or quantization, cavity with perfectly reflecting walls, where the walls are of length L. FIG. 3 illustrates a cubic cavity 300. Orthogonal axes 302, 304, and 306 represent the x, y, and z Cartesian coordinate axes. The finite dimensional cubic cavity 300 imposes periodic boundary conditions on solutions to the wave equation. For example, in the x, y, and z-directions, plane wave solutions to the vector potential wave equation satisfy the condition:

$$\exp(i\vec{k}\cdot\vec{r}) = \exp(i\vec{k}\cdot(\vec{r}+\vec{L}))$$

where $\vec{L}$ is vector (L, L, L), and
$\vec{k}$ is called the "wavevector" with components:

$$\vec{k} = \frac{2\pi}{L}(m_x, m_y, m_z), \text{ and}$$

$m_x$, $m_y$, and $m_z$ are integers.

Each set of integers $(m_x, m_y, m_z)$ specifies a normal mode of the electromagnetic radiation, and the magnitude of the wavevector $\vec{k}$, k, is equal to $\omega_k/c$, where c represents the speed of light in free space and $\omega_k$ is the angular frequency. Note that in real life the spectrum of normal modes of an electromagnetic field is actually continuous and a discrete spectrum of normal modes suggested by the wavevector $\vec{k}$ is an approximation to the continuous spectrum.

A propagating vector potential solution to the wave equation above that satisfies the periodic boundary conditions is:

$$A(r, t) = \sum_{\vec{k},s} \vec{e}_{\vec{k}s}\left(A_{\vec{k}s} e^{i(\vec{k}\cdot\vec{r}-\omega_k t)} + A^*_{\vec{k}s} e^{-i(\vec{k}\cdot\vec{r}-\omega_k t)}\right)$$

where $A_{\vec{k}s}$ is a complex amplitude of the electromagnetic radiation;

$\vec{e}_{\vec{k}s}$ represents two unit-length polarization vectors; and $m_x, m_y, m_z = 0, \pm 1, \pm 2, \pm 3, \ldots$.

The sum over $\vec{k}$ represents the sum over the integers ($m_x, m_y, m_z$), and the sum over s is the sum over the two independent polarizations that are associated with each $\vec{k}$. The two polarization vectors are orthogonal as indicated by:

$$\vec{e}_{\vec{k}s} \cdot \vec{e}_{\vec{k}s'} = \delta_{ss'},$$

and from the gauge condition given above:

$$\vec{k} \cdot \vec{e}_{\vec{k}s} = 0,$$

for both polarization directions s. The two polarization vectors $\vec{e}_{\vec{k}1}$ and $\vec{e}_{\vec{k}2}$ form a right-handed coordinate system with a normalized wavevector given by:

$$\vec{e}_{\vec{k}1} \times \vec{e}_{\vec{k}2} = \frac{\vec{k}}{|\vec{k}|} = \tilde{\kappa}$$

Figure 4:
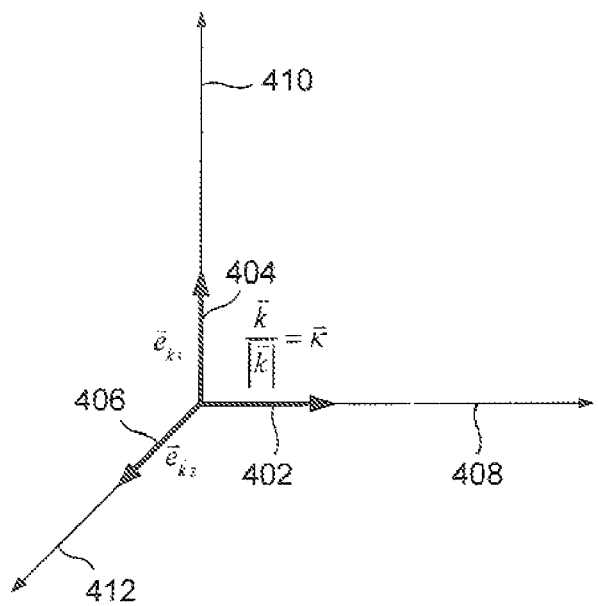
FIG. 4 illustrates a three-dimensional coordinate system with two independent polarization vectors and a normalized wavevector as basis vectors.

FIG. 4 illustrates a three-dimensional right-handed coordinate system with two independent polarization vectors $\vec{e}_{\vec{k}s}$ and a normalized wavevector $\tilde{\kappa}$ as basis vectors. In FIG. 4, the wavevector $\tilde{\kappa}$ 402, and the polarization vectors, $\vec{e}_{\vec{k}1}$ 404 and $\vec{e}_{\vec{k}2}$ 406, are three orthogonal unit length basis vectors of a coordinate system with coordinate axes represented by lines 408, 410, and 412, respectively.

The propagating electric and magnetic field components of the vector potential are:

$$\vec{E}(\vec{r}, t) = i\sum_{\vec{k},s} \omega_k \vec{e}_{\vec{k}s}\left[A_{\vec{k}s} e^{i(\vec{k}\cdot\vec{r}-\omega_k t)} - A^*_{\vec{k}s} e^{-i(\vec{k}\cdot\vec{r}-\omega_k t)}\right], \text{ and}$$

$$\vec{B}(\vec{r}, t) = \frac{i}{c}\sum_{\vec{k},s} \omega_k (\tilde{\kappa} \times \vec{e}_{\vec{k}s})\left[A_{\vec{k}s} e^{i(\vec{k}\cdot\vec{r}-\omega_k t)} - A^*_{\vec{k}s} e^{-i(\vec{k}\cdot\vec{r}-\omega_k t)}\right]$$

Both the electric field $\vec{E}(\vec{r},t)$ and magnetic field $\vec{B}(\vec{r},t)$ are propagating wave solutions referred to as the "classical" representation of the electric and magnetic field, are orthogonal to one another, and are both orthogonal to the wavevector $\vec{k}$.

Figure 5:
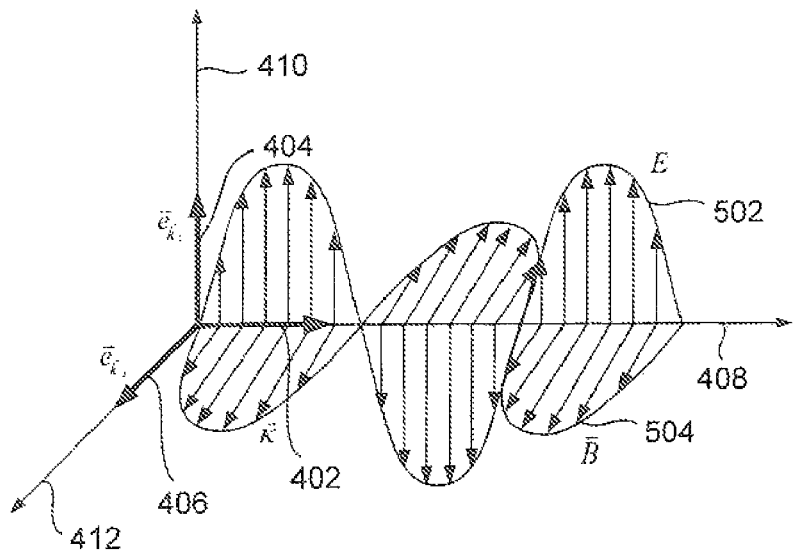
FIG. 5 illustrates a representation of electric and magnetic field components of electromagnetic radiation in the coordinate system shown in FIG. 4.

FIG. 5 illustrates a representation of electric and magnetic field components of electromagnetic radiation in the right-handed coordinate system shown in FIG. 4. The electromagnetic radiation is directed along the wavevector $\tilde{\kappa}$ 402 axis.

The electric field component $\vec{E}(\vec{r},t)$ 502 and magnetic field component $\vec{B}(\vec{r},t)$ 504 are directed along the orthogonal polarization vectors $\vec{e}_{\vec{k}1}$ 404 and $\vec{e}_{\vec{k}2}$ 406, respectively, and appear frozen at a particular time t.

The energy of the electromagnetic radiation can be determined by evaluating the Hamiltonian:

$$H = \frac{1}{2}\int_V \left(\varepsilon_0 \vec{E}\cdot\vec{E} + \frac{1}{\mu_0}\vec{B}\cdot\vec{B}\right)dV$$

$$= 2\varepsilon_0 V \sum_{\vec{k},s} \omega_k^2 A_{\vec{k}s} A^*_{\vec{k}s},$$

where $\varepsilon_0$ is the electric permittivity of free space, $\mu_0$ is the magnetic permeability of free space, and V is the volume of the cavity.

The electric permittivity $\varepsilon_0$ represents the degree to which a vacuum space can store electrical potential energy under the influence of an electric field, and the magnetic permeability $\mu_0$ represents the degree to which the vacuum modifies the flux of a magnetic field. In a non-conducting medium, the electric permittivity is further multiplied by $\varepsilon$, which is the degree to which the medium enhances the storage of electrical potential energy, and the magnetic permeability is further multiplied by $\mu$, which is the degree to which the medium further enhances the flux of a magnetic field.

In order to quantize the electric field $\vec{E}(\vec{r},t)$ and magnetic field $\vec{B}(\vec{r},t)$ components, the canonical variables for position, $q_{\vec{k}s}$, and momentum, $p_{\vec{k}s}$, are introduced into the Hamiltonian by setting:

$$A_{\vec{k}s} = \frac{1}{2\omega_k\sqrt{\varepsilon_0 V}}(\omega_k q_{\vec{k}s} + i p_{\vec{k}s})$$

As a result, the Hamiltonian for the electromagnetic radiation becomes:

$$H = \frac{1}{2}\sum_{\vec{k},s}\left(p_{\vec{k}s}^2 + \omega_k^2 q_{\vec{k}s}^2\right)$$

Each term in the Hamiltonian is the energy of a harmonic oscillator with vibrational mode $\vec{k}$ s, where the term $p_{\vec{k}s}^2/2$ is the kinetic energy, and the term $\omega_k q_{\vec{k}s}^2/2$ is the potential energy of a harmonic oscillator with a unit mass. The Hamiltonian is quantized by replacing the position and momentum variables $q_{\vec{k}s}$ and $p_{\vec{k}s}$ with quantum mechanical position and momentum operators $\hat{q}_{\vec{k}s}$ and $\hat{p}_{\vec{k}s}$, respectively, to give the quantum Hamiltonian operator:

$$\hat{H} = \frac{1}{2}\sum_{\vec{k},s}\left(\hat{p}_{\vec{k}s}^2 + \omega_k^2 \hat{q}_{\vec{k}s}^2\right)$$

Annihilation and creation operators are defined by:

$$\hat{a}_{\vec{k}s} = \frac{1}{\sqrt{2\hbar\omega_k}}\left(\omega_k \hat{q}_{\vec{k}s} + i\hat{p}_{\vec{k}s}\right), \text{ and}$$

$$\hat{a}_{\vec{k}s}^\dagger = \frac{1}{\sqrt{2\hbar\omega_k}}\left(\omega_k \hat{q}_{\vec{k}s} - i\hat{p}_{\vec{k}s}\right),$$

and substituting the annihilation and creation operators in the quantum Hamiltonian operator gives:

$$\hat{H} = \sum_{\vec{k},s}\hbar\omega_k \left(\hat{a}_{\vec{k}s}^\dagger \hat{a}_{\vec{k}s} + \frac{1}{2}\right),$$

where $\hat{a}_{\vec{k}s}^\dagger \hat{a}_{\vec{k}s}$ is called the "number operator" and is also denoted by $\hat{n}_{\vec{k}s}$. Using the canonical commutation relations for the position and momentum operators, the annihilation and creation operators satisfy the commutation relations given by:

$$[\hat{a}_{\vec{k}s}, \hat{a}_{\vec{k}'s'}] = 0 = [\hat{a}_{\vec{k}s}^\dagger, \hat{a}_{\vec{k}'s'}^\dagger], \text{ and}$$

$$[\hat{a}_{\vec{k}s}, \hat{a}_{\vec{k}'s'}^\dagger] = \delta_{\vec{k}\vec{k}'}\delta_{ss'}$$

When the electromagnetic radiation is quantized, the amplitudes $A_{\vec{k}s}$ become operators:

$$\hat{A}_{\vec{k}s} = \sqrt{\frac{\hbar}{2\omega_k \varepsilon_0 V}}\, \hat{a}_{\vec{k}s},$$

which can be substituted in the classical electric and magnetic field equations above to obtain electric and magnetic field operators:

$$\hat{E}(\vec{r},t) = i\sum_{\vec{k},s}\sqrt{\frac{\hbar\omega}{2\varepsilon_0 V}}\, e_{\vec{k}s}\left[\hat{a}_{\vec{k}s} e^{i(k\cdot r - \omega_k t)} - \hat{a}_{\vec{k}s}^\dagger e^{-i(k\cdot r - \omega_k t)}\right], \text{ and}$$

$$\hat{B}(\vec{r},t) = \frac{i}{c}\sum_{\vec{k},s}(\vec{k}\times e_{\vec{k}s})\sqrt{\frac{\hbar\omega}{2\varepsilon_0 V}}\, e_{\vec{k}s}\left[\hat{a}_{\vec{k}s} e^{i(k\cdot r - \omega_k t)} - \hat{a}_{\vec{k}s}^\dagger e^{-i(k\cdot r - \omega_k t)}\right]$$

Both the electric and magnetic field operators are Hermitian and represent measurable electric and magnetic fields.

The electric field accounts for most of the interactions with charged matter, because the magnitude of the magnetic field is smaller than the electric field by the factor 1/c. As a result, the electric field alone is generally used to characterize the behavior of electromagnetic radiation and any interactions with charged matter, and the magnetic field component can be ignored.

Quantum computation and quantum information processing systems can be operated using a single-mode $\vec{k}$ s of electromagnetic radiation. As a result, the Hamiltonian operator for a single-mode of electromagnetic radiation reduces to:

$$\hat{H} = \hbar\omega\left(\hat{a}^\dagger \hat{a} + \frac{1}{2}\right),$$

where $\hat{a}$ and $\hat{a}^\dagger$ replace the mode-dependent operators $\hat{a}_{\vec{k}_j s_j}$ and $\hat{a}_{\vec{k}_j s_j}^\dagger$ in the Hamiltonian above. The eigenstates and the corresponding energy eigenvalues of the single-mode Hamiltonian are:

$$\hat{H}|n\rangle = \hbar\omega\left(\hat{a}^\dagger \hat{a} + \frac{1}{2}\right)|n\rangle = E_n|n\rangle,$$

where $|n\rangle$ is called a "number state," n is a nonnegative integer called a "photon number," and $E_n$ is an energy eigenvalue.

The annihilation and creation operators operate on a number state as follows:

$$\hat{a}|n\rangle = \sqrt{n}|n-1\rangle,$$

$$\hat{a}^\dagger|n\rangle = \sqrt{n+1}|n+1\rangle, \text{ and}$$

$$\hat{n}|n\rangle = n|n\rangle,$$

where $\hat{n}$ represents the operator $\hat{a}^\dagger \hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}}|n\rangle,$$

where $|0\rangle$ is called the "vacuum state" and represents the lowest energy state of the electromagnetic radiation. Beginning with the vacuum state, and repeatedly applying the creation operator gives:

$$|n\rangle = \frac{(\hat{a}^\dagger)^n}{\sqrt{n!}}|0\rangle$$

The number states are orthogonal and form a compete set represented by:

$$\langle n'|n\rangle = \delta_{n'n}, \text{ and}$$

$$\sum_{n=0}^\infty |n\rangle\langle n| = 1$$

In general, the energy eigenvalue equation associated with a number state $|n\rangle$ is:

$$\hat{H}|n\rangle = \hbar\omega\left(n + \frac{1}{2}\right)|n\rangle = E_n|n\rangle.$$

Applying the annihilation and creation operators to the energy eigenvalue equation gives:

$$\hat{H}(\hat{a}|n\rangle) = \hbar\omega\left(n - \frac{1}{2}\right)|n-1\rangle = (E_n - \hbar\omega)|n-1\rangle, \text{ and}$$

$$\hat{H}(\hat{a}^\dagger|n\rangle) = \hbar\omega\left(n + \frac{3}{2}\right)|n+1\rangle = (E_n + \hbar\omega)|n+1\rangle,$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons $\hbar\omega$ comprising the electromagnetic radiation.

Figure 6:
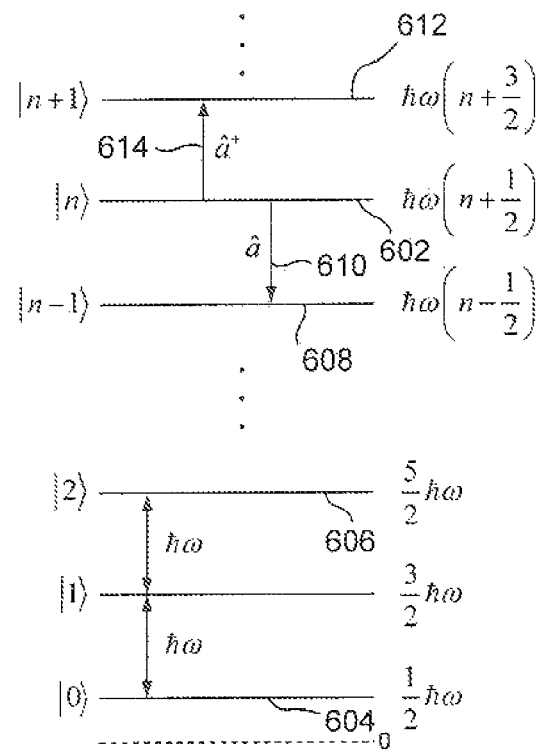
FIG. 6 is an energy-level diagram of quantized electromagnetic radiation.

FIG. 6 is an energy level diagram of quantized electromagnetic radiation. Horizontal lines, such as horizontal line 602, represent energy levels of electromagnetic radiation. Energy level 604 is the lowest energy level, which corresponds to the vacuum state $|0\rangle$. The energy of the vacuum state is $\hbar\omega/2$ or ½ the energy of a single photon. Higher energy levels of electromagnetic radiation are each separated by the same quantum of energy $\hbar\omega$. For example, the energy level 606 represents electromagnetic radiation with a total electromagnetic energy of $5\hbar\omega/2$, which can be thought of as the energy of two photons plus the vacuum state energy $\hbar\omega/2$. The annihilation operator corresponds to removal of a photon from the electromagnetic radiation, and the creation operator corresponds to addition of a photon to the electromagnetic radiation. For example, the annihilation operator â represents an electromagnetic-radiation transition 610 from the state $|n\rangle$ 602 to the lower energy state $|n-1\rangle$ 608. The transition 610 is achieved by giving up a photon to the surroundings. By contrast, the creation operator $\hat{a}^\dagger$ represents an electromagnetic-radiation transition 614 from the state $|n\rangle$ 602 to the higher energy state $|n+1\rangle$ 612. The transition 614 is achieved by accepting a photon from the surroundings. Note that typically the surroundings can be an atom, a quantum dot, or any other system that couples to the field through a dipole interaction. Loss or absorption of a photon will involve a simultaneous excitation of the surrounding system and creation or emission of a photon will involve a corresponding de-excitation of the surrounding system.

Photons can be generated by a photon source and transmitted through free space or in an optical fiber. The photon source can be a pulsed laser that generates a single pulse or a train of pulses, each pulse containing one or more photons that all have the same optical properties, such as wavelength and direction. Photons with the same optical properties are called "coherent." However, the source, the detector, and a medium, such as an optical fiber, separating the source from the detector do not define an optical cavity. The source and the detector are parts of a continuous unidirectional flow of optical energy with no significant reflection or recycling of the optical energy. A pulse transmitted through free space or an optical fiber is described by a wavepacket that can be represented by a time-dependent, Gaussian-shaped function given by:

$$\xi(t) = \left(\frac{2\Delta^2}{\pi}\right)^{\frac{1}{4}} \exp\{-i\omega_0 t - \Delta^2(t_0 - t)^2\},$$

where
$\omega_0$ is the central frequency of the pulse spectrum,
t is time,
$t_0$ is the time at which the peak of the wavepacket is located at a distance $z_0$ from the photon source, and
$\Delta^2$ is the variance of the intensity spectrum.

The time to can be determined by $z_0/v$, where v is the velocity of the pulse traveling through free space or in an optical fiber.

The wavepacket $\xi(t)$ is the amplitude of the pulse, and $|\xi(t)|^2$ is a photodetection probability density function of the pulse, where the photodetection probability density function $|\xi(t)|^2$ satisfies the normalization condition:

$$\int_{-\infty}^{\infty} dt|\xi(t)|^2 = 1$$

The probability of photodetection of a photon in the time interval $(t_1,t_2)$ at a distance $z_0$ from the photon source is given by:

$$\text{Probability of } (t_1 < t_2) = \int_{t_1}^{t_2} dt|\xi(t)|^2$$

Figure 7:
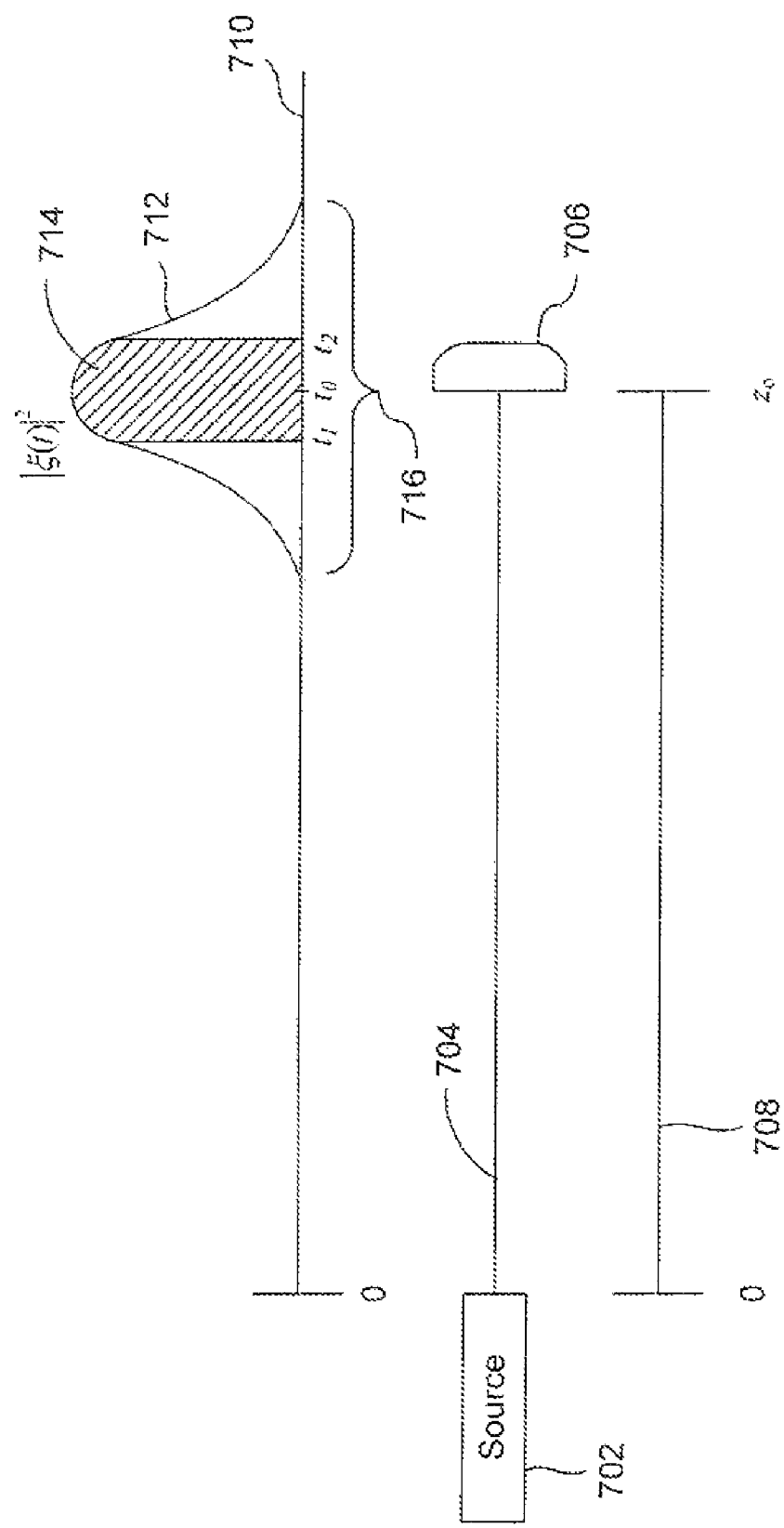
FIG. 7 illustrates a probability distribution function associated with detecting a photon pulse output from a source and transmitted to a detector.

FIG. 7 illustrates a probability distribution associated with a pulse output from a source 702 and transmitted in an optical fiber 704 to a detector 706. The horizontal line 708 represents the distance $z_0$ the photon travels from the source 702 to the detector 706, and the horizontal line 710 is a time axis. The curve 712 represents the photodetection probability density function $|\xi(t)|^2$. In FIG. 7, the photodetection probability density function $|\xi(t)|^2$ 712 is centered at the time $t_0$, which corresponds to the time a pulse takes to travel the distance $z_0$. An area under the curve 712 represents the probability of detecting the pulse within a particular time period. For example, hash-marked region 714 represents the probability of detecting the photon within the time period $t_1<t_0<t_2$. Time period 716 is called a "time bin" and corresponds to the time period within which the photon is detected at the detector 706.

The time dependent creation operators can be used to generate a photon wavepacket creation operator as follows:

$$\hat{a}_\xi^\dagger = \int_{-\infty}^{\infty} dt \xi(t)\hat{a}^\dagger(t)$$

The creation operator can be used to construct continuous-mode number states that represent photons transmitted through free space or in an optical fiber as follows:

$$|n_\xi\rangle = \frac{(\hat{a}_\xi^\dagger)^n}{\sqrt{n!}}|0\rangle,$$

where $|0\rangle$ is the continuous-mode vacuum state. The continuous-mode number states satisfy the following same conditions:

$$\hat{n}|n_\xi\rangle = n|n_\xi\rangle, \langle n'_\xi | n_\xi\rangle = \delta_{n'n}, \text{ and } \sum_{n_\xi=0}^{\infty} |n_\xi\rangle\langle n_\xi| = 1$$

As a result, the subscript $\xi$ used to identify continuous-mode number states can be dropped. Note that the wavepacket constructed photon is not an eigenstate of any Hamiltonian.

An Overview of Quantum Entanglement

A quantum system comprising a first quantum subsystem and a second quantum subsystem has a Hilbert space $H_A \otimes H_B$, where $H_A$ is a Hilbert space associated with the first quantum system, and $H_B$ is a Hilbert space associated with the second quantum system. The kets $|i\rangle_A$ represent the orthonormal eigenstates of the Hilbert space $H_A$, and the kets $|j\rangle_B$ represents the orthonormal eigenstates of the Hilbert space $H_B$, where i and j are positive integers. Any linear superposition of states in the Hilbert space $H_A \otimes H_B$ is given by:

$$|\Psi\rangle_{AB} = \sum_{i,j} c_{ij}|i\rangle_A|j\rangle_B,$$

where the amplitudes $c_{ij}$ are complex numbers satisfying the condition:

$$\sum_{ij}|c_{ij}|^2 = 1$$

Special kinds of linear superpositions of states $|\Psi\rangle_{AB}$ are called "direct product states" and are represented by the product:

$$|\Psi\rangle_{AB} = |\psi\rangle_A|\psi\rangle_B = \left(\sum_i c_i^{(A)}|i\rangle_A\right)\left(\sum_j c_j^{(B)}|j\rangle_B\right),$$

where $|\psi\rangle_A$ is a normalized linear superposition of states in the Hilbert space $H_A$;

and $|\psi\rangle_B$ is a normalized linear superposition of states in the Hilbert space $H_B$.

For example, the state of a combined qubit system comprising two qubit systems is represented by a product of qubits as follows:

$$|\psi\rangle_{12} = |\psi\rangle_1|\psi\rangle_2$$

where the state of the first qubit system is:

$$|\psi\rangle_1 = \frac{1}{\sqrt{2}}(|0\rangle_1 + |1\rangle_1)$$

and the state of the second qubit system is:

$$|\psi\rangle_2 = \frac{1}{\sqrt{2}}(|0\rangle_2 + |1\rangle_2)$$

The state $|\psi\rangle_{12}$ can also be written as a linear superposition of states:

$$|\psi\rangle_{12} = |\psi\rangle_1|\psi\rangle_2$$
$$= \frac{1}{2}(|0\rangle_1|0\rangle_2 + |0\rangle_1|1\rangle_2 + |1\rangle_1|0\rangle_2 + |1\rangle_1|1\rangle_2)$$

where the terms $|0\rangle_1|0\rangle_2$, $|0\rangle_1|1\rangle_2$, $|1\rangle_1|0\rangle_2$, and $|1\rangle_1|1\rangle_2$ are product states. Each product state in the state $|\psi\rangle_{12}$ has an associated coefficient of ½, which indicates that when the state of the first qubit system is measured in the bases $\{|0\rangle_1,|1\rangle_1\}$, and the state of the second qubit system is measured in the basis $\{|0\rangle_2,|1\rangle_2\}$, there is a ¼ probability of the combined qubit systems being found in any one of the product states. For example, when the states of the first and the second qubit systems are measured in the bases $\{|0\rangle_1,|1\rangle_1\}$ and $\{|0\rangle_2,|1\rangle_2\}$, respectively, there is a ¼ ($|½|^2$) probability of projecting the state of the combined qubit system onto the product state $|1\rangle_1|1\rangle_2$.

However, other linear superpositions in the Hilbert space $H_A \otimes H_B$ cannot be written as a product state are entangled states. In general, for a Hilbert space comprising two or more quantum subsystems, an entangled state is a linear superposition of states that cannot be written as a direct product state. For example, an entangled state representation of an entangled two-qubit system can be:

$$|\phi\rangle_{12} = 1/\sqrt{2}(|0\rangle_1|1\rangle_{23} + |1\rangle_1|0\rangle_2)$$

The entangled state $|\phi\rangle_{12}$ cannot be factored into a product of the qubits $\alpha_1|0\rangle_1 + \beta_1|1\rangle_1$ and $\alpha_2|0\rangle_2 + \beta_2|1\rangle_2$, for any choice of the parameters $\alpha_1$, $\beta_1$, $\alpha_2$, and $\beta_2$.

The state of an un-entangled, two-qubit system can be distinguished from the state of an entangled, two-qubit system as follows. Consider an un-entangled two-qubit system in the un-entangled state $|\psi\rangle_{12}$. Suppose a first measurement performed on the first qubit system in the basis $\{|0\rangle_1,|1\rangle_1\}$ projects the state of the first qubit system onto the state $|0\rangle_1$. According to the state $|\psi\rangle_{12}$, the state of the un-entangled, two-qubit system just after the measurement is the linear superposition of states $(|0\rangle_1|0\rangle_2 + |0\rangle_1|1\rangle_2)/\sqrt{2}$. When a second measurement is performed on the second qubit system in the basis $\{|0\rangle_2,|1\rangle_2\}$ immediately following the first measurement in an identical reference frame, there is a ½ probability of projecting the state of the second qubit system onto the state $|0\rangle_2$ and a ½ probability of projecting the state of the second qubit system onto the state $|1\rangle_2$. In other words, the state of the second qubit system is not correlated with the state of the first qubit system. By contrast, consider an entangled, two-qubit system in the entangled state $|\phi\rangle_{12}$. Suppose that a first measurement performed on the first qubit system in the basis $\{|0\rangle_1,|1\rangle_1\}$ also projects the state of the first qubit system onto the state $|0\rangle_1$. According to the entangled state $|\phi\rangle_{12}$, the state of the entangled, two-qubit system after the first measurement is the product state $|0\rangle_1|1\rangle_2$. When a second measurement is performed on the second qubit system in the basis $\{|0\rangle_2,|1\rangle_2\}$, the state of the second qubit system is $|1\rangle_2$ with certainty. In other words, the states of the first and second qubit systems in the entangled state $|\phi\rangle_{12}$ are correlated.

Polarization States and Stokes Parameters

In the current subsection, polarization states of electromagnetic radiation are discussed. As described above with reference to FIG. 5, electromagnetic radiation may be treated as propagating transverse electromagnetic waves. Each electromagnetic wave includes an electric field $\vec{E}(\vec{r},t)$ and a magnetic field $\vec{B}(\vec{r},t)$ component. However, it is the electric field component, alone, that can be used to represent an electromagnetic wave, because the electric field accounts for most of the interactions with charged matter and the magnitude of the magnetic field is smaller than the electric field by the factor 1/c. As shown in FIG. 5, when both the oscillating electric field $\vec{E}(\vec{r},t)$ component and the associated wavevector $\vec{k}$ of an electromagnetic field reside in a plane-of-vibration the field is said to be "linearly polarized." Definite polarization states can be created by transmitting electromagnetic radiation comprising numerous randomly polarized electromagnetic waves through one or more polarizers. Each polarizer is a device that transmits only the electromagnetic waves with electric field components that are aligned with the polarization axis of the polarizer.

Any two orthogonal linear polarization states can be used to define a polarization basis, denoted by $\{|H\rangle,|V\rangle\}$. The first polarization state $|H\rangle$ represents an electromagnetic wave polarized in a first direction, called the "horizontal polarization," and the second polarization state $|V\rangle$ represents an electromagnetic wave polarized in a second direction that is orthogonal to the first direction, called the "vertical polarization." The polarization basis states satisfy the following conditions:

$$\langle H|H\rangle = \langle V|V\rangle = 1, \text{ and}$$

$$\langle H|V\rangle = 1$$

Figure 8A:
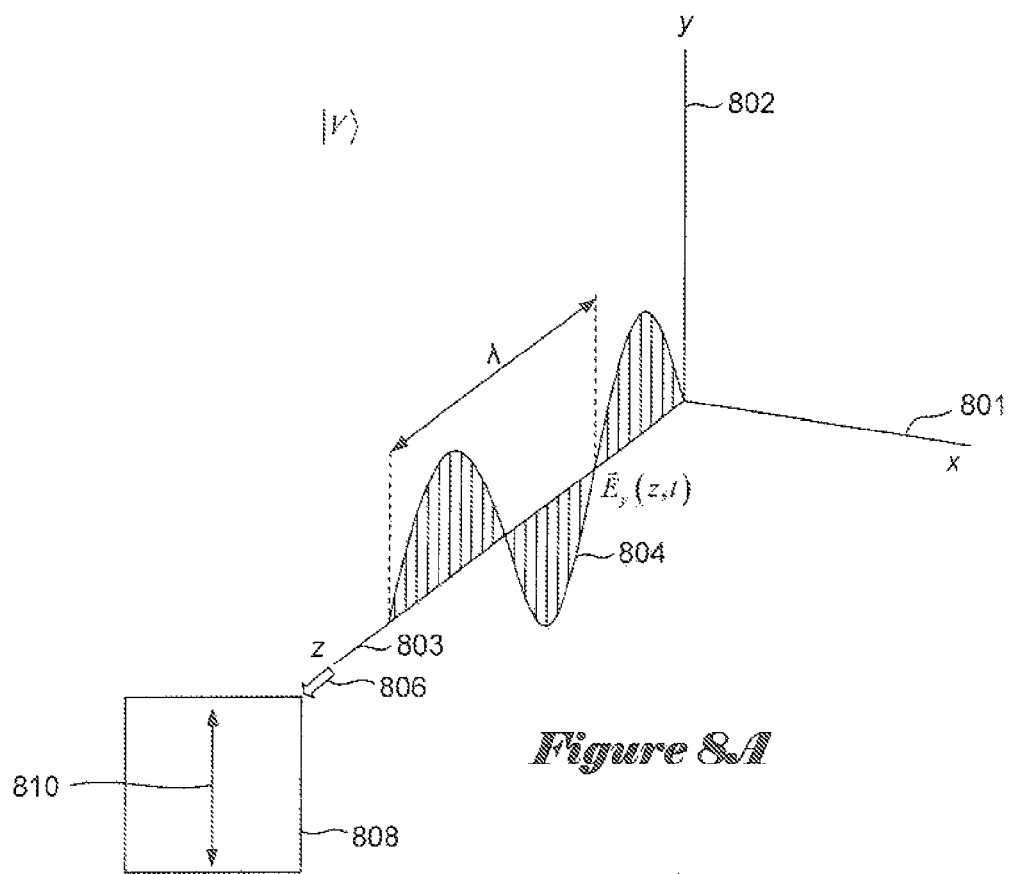
FIGS. 8A-8B show plots of vertical and horizontal polarization basis states.
Figure 8B:
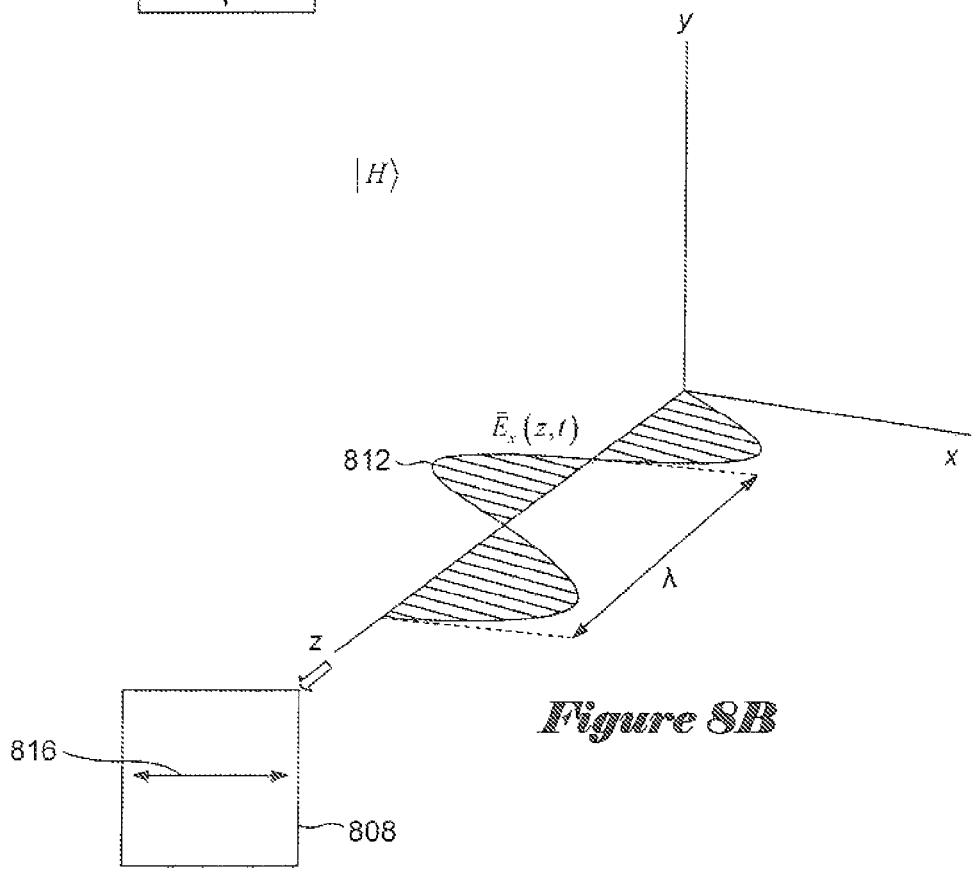

FIGS. 8A-8B show plots of the polarization basis states $|H\rangle$ and $|V\rangle$. In FIGS. 8A-8B, mutually perpendicular axes, such as mutually perpendicular axes 801-803 in FIG. 8A, represent the x, y, and z Cartesian coordinate axes, respectively. FIG. 8A shows a vertical polarization state $|V\rangle$ of an electric field $\vec{E}_y(z,t)$ 804 that lies in the yz-plane. Directional arrow 806 represents the direction the electric field $\vec{E}_y(z,t)$ 804 propagates toward a plane of observation 808. From the plane of observation 808, one can observe the electric field $\vec{E}_y(z,t)$ 804 progress through one complete oscillatory cycle as the wave propagates along the z-axis through one wavelength λ. The oscillatory cycle is represented by a double-headed directional arrow 810. FIG. 8B shows a horizontal polarization state $|H\rangle$ of an electric field $\vec{E}_x(z,t)$ 812 that lies in the xz-plane. The associated horizontal oscillatory cycle is represented by a double-headed directional arrow 816 in the plane of observation 808.

The polarization basis $\{|H\rangle,|V\rangle\}$ can also be used to construct an infinite number of polarization states represented by $|\chi\rangle$. These polarization states simultaneously comprise both $|H\rangle$ and $|V\rangle$ and can be represented mathematically as a coherent linear superposition of states:

$$|\chi\rangle = \cos\left(\frac{\theta}{2}\right)|H\rangle + e^{i\phi}\sin\left(\frac{\theta}{2}\right)|V\rangle$$

where
$0 \leq \theta < \theta$, and
$0 \leq \phi < 2\pi$.

An infinite number of polarization states of an electromagnetic wave can be geometrically represented by a three-dimensional Bloch sphere, which in this case is also called the "Poincare sphere."

Figure 9:
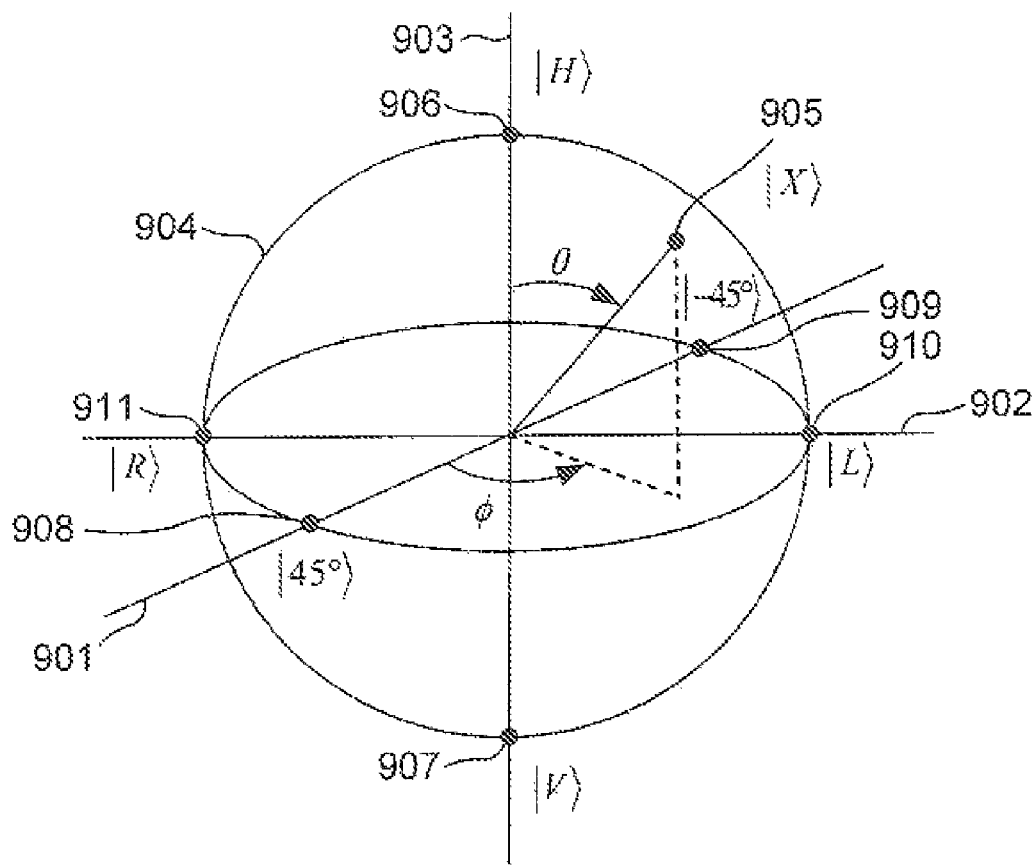
FIG. 9 illustrates a Poincare sphere representation of polarization states.

FIG. 9 illustrates a Poincare sphere representation of polarization states. As shown in FIG. 9, lines 901-903 are orthogonal coordinate axes, respectively, and a Poincare sphere 904 is centered at the origin. There are an infinite number of points on the Poincare sphere 904, each point representing a unique pure polarization state $|\chi\rangle$ of an electromagnetic wave. For example, a point 905 on the Poincare sphere 904 represents a polarization state $|\chi\rangle$ that simultaneously comprises, in part, the state $|H\rangle$ and, in part, the state $|V\rangle$. The six points 906-911 identify intersections between the Poincare sphere 904 and the coordinate axes 901-903. The points 906 and 907 identify the polarization basis states $|H\rangle$ and $|V\rangle$, respectively, and the points 908-911 represent orthogonal polarization states:

$$|45°\rangle = \frac{1}{\sqrt{2}}(|H\rangle + |V\rangle),$$

$$|-45°\rangle = \frac{1}{\sqrt{2}}(|H\rangle - |V\rangle),$$

$$|R\rangle = \frac{1}{\sqrt{2}}(|H\rangle - i|V\rangle), \text{ and}$$

$$|L\rangle = \frac{1}{\sqrt{2}}(|H\rangle + i|V\rangle),$$

respectively.

Figure 10A:
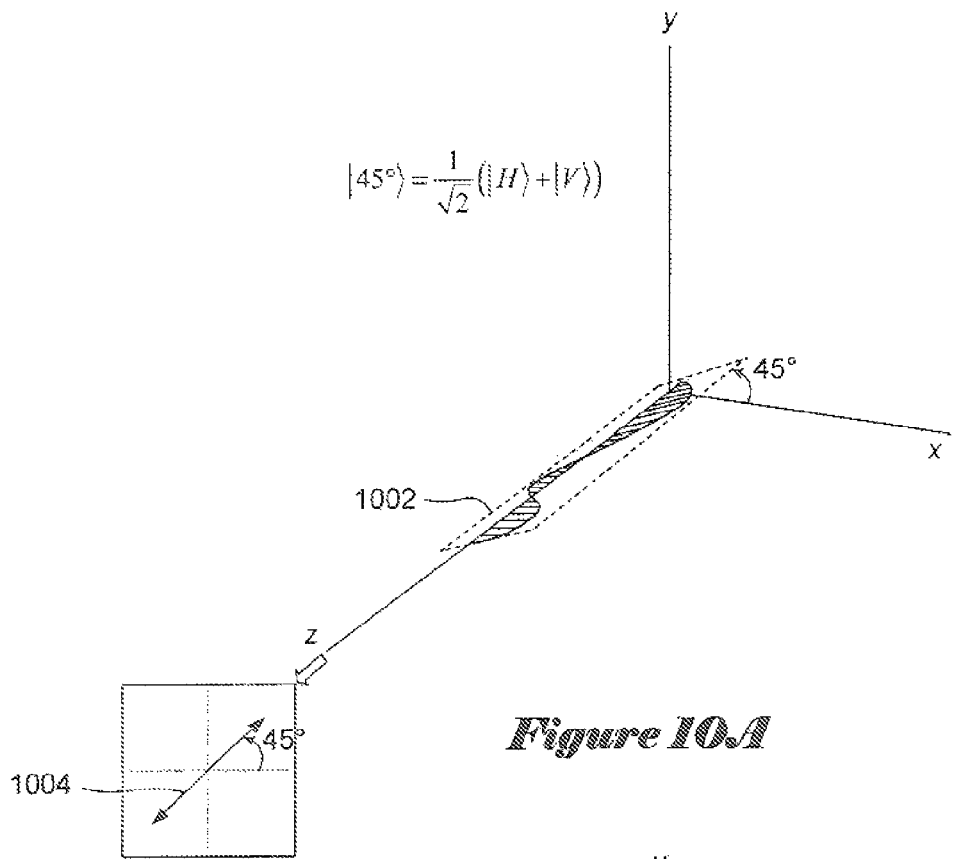
FIGS. 10A-10D show plots of four polarization states.
Figure 10B:
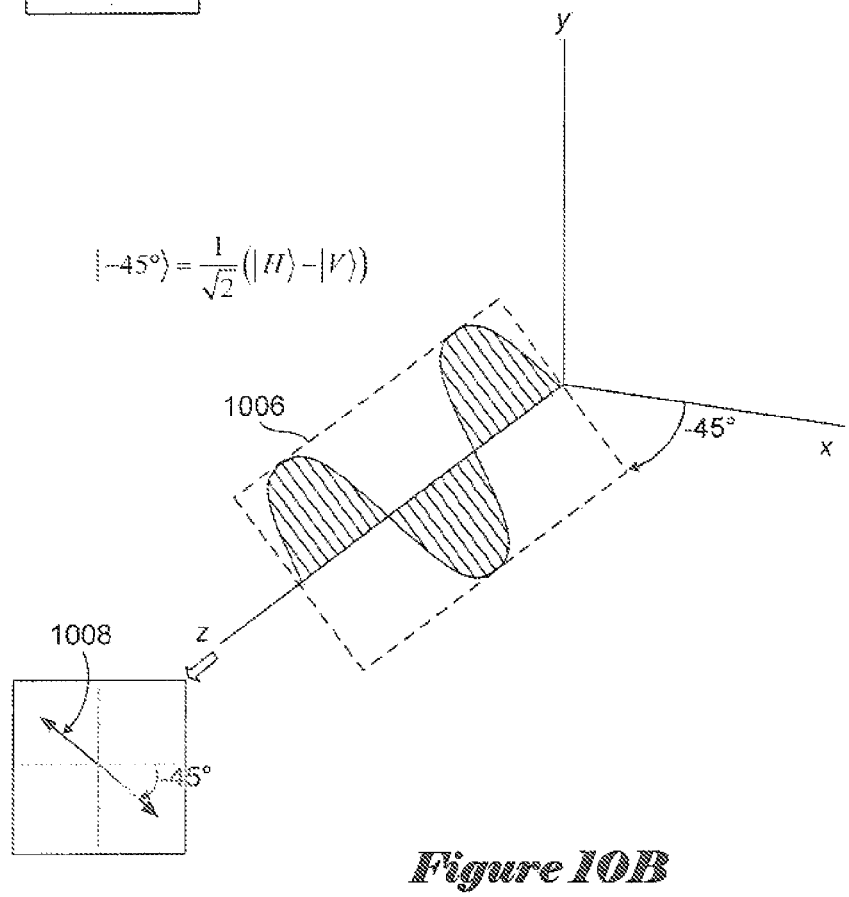
Figure 10C:
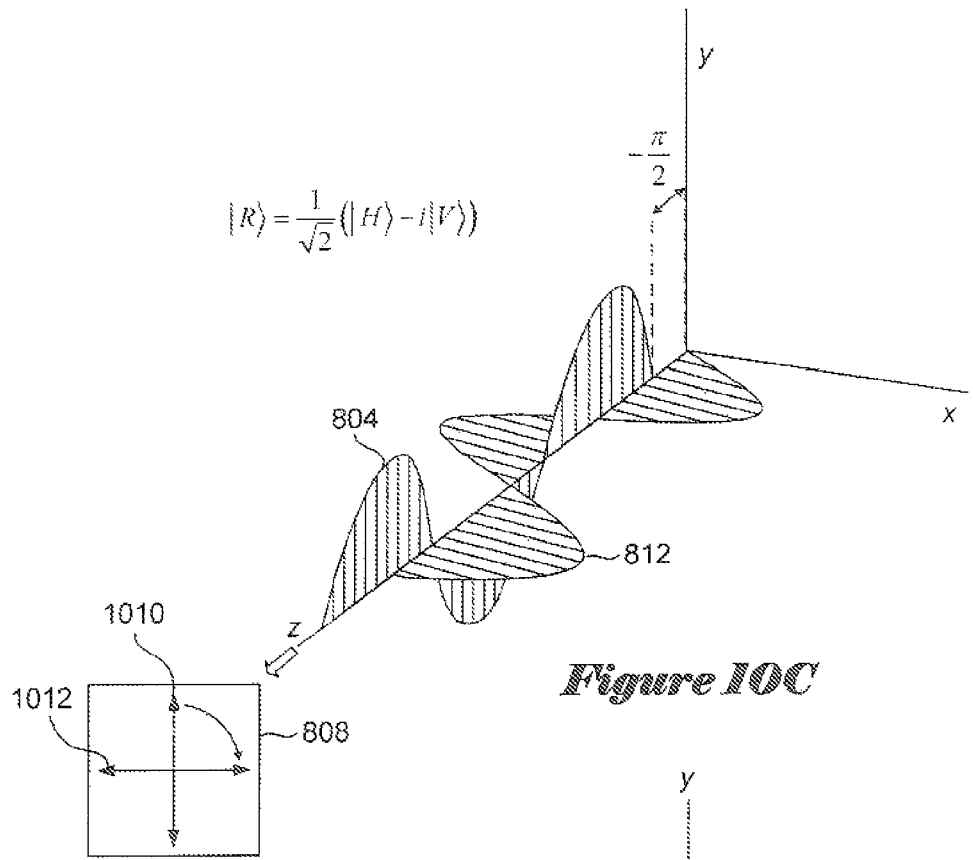
Figure 10D:
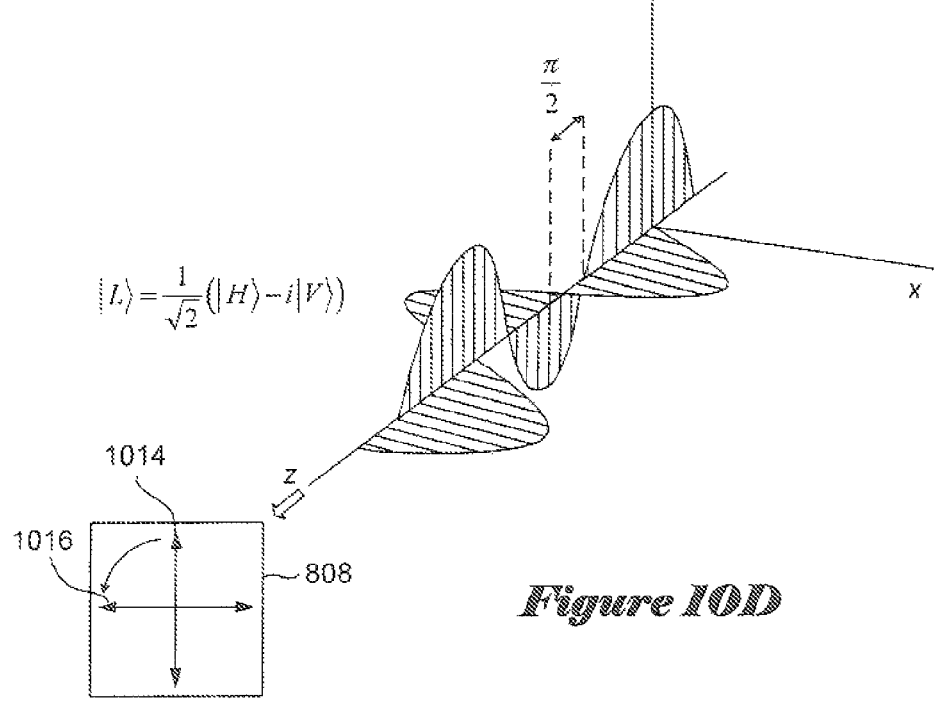

FIGS. 10A-10D show plots of the four polarization states $|45°\rangle$, $|-45°\rangle$, $|R\rangle$ and $|L\rangle$, respectively. FIG. 10A shows the 45° polarization state $|45°\rangle$ that lies within a plane-of-vibration 1002 tilted at a 45° angle to the horizontal xz-plane. The oscillatory cycle of the polarization state $|45°\rangle$ is represented by a double-headed directional arrow 1004. FIG. 10B shows the −45° polarization state $|-45°\rangle$ that lies within a plane-of-vibration 1006 tilted at a −45° angle to the horizontal xz-plane. The oscillatory cycle of the polarization state $|-45°\rangle$ is represented by a double-headed directional arrow 1008. FIG. 10C shows a right circular polarization state $|R\rangle$ comprising the vertical and horizontal polarized fields 804 and 812, in FIGS. 8A and 8B, with a relative phase difference of −π/2. The result is an oscillatory cycle represented by two orthogonal double-headed directional arrows 1010 and 1012 that rotate in a clockwise direction within the plane of observation 808 as the fields 804 and 812 are transmitted along the z-axis. FIG. 10D shows a left circular polarization state also comprising the vertical and horizontal polarized fields 804 and 812 with a relative phase difference of λ/2. The oscillatory cycle of the left-hand polarization state is represented by two orthogonal double-headed directional arrows 1014 and 1016 that rotate in a counterclockwise direction within the plane of observation 808.

Any polarization state can be represented by a linear combination of four quantities, called "Stokes parameters," that are functions only of intensities of the electromagnetic radiation. Stokes parameters are a convenient way to represent the polarization states of electromagnetic radiation because electromagnetic radiation measurements typically can only determine intensities and not the polarization state. The Stokes parameters can be defined operationally by considering a set of four filters, each of which transmits 50% of any incident electromagnetic radiation and discards the remaining 50%. The first filter is assumed to transmit all polarization states of electromagnetic radiation. The second and third filters are linear polarizers that transmit only horizontally polarized radiation and radiation polarized at 45° to the horizontal, respectively. The fourth polarizer only transmits right circular polarized electromagnetic radiation. Each of these four filters is positioned in the path of a beam of electromagnetic radiation. Note that the choice of filters is not unique. A number of equivalent polarizations exist. Because the intensities are proportional to the number of photons counted by a detector, the Stokes parameters can be defined by:

$$S_0 = 2n_0,$$

$$S_1 = 2(n_1 - n_0)$$

$$S_2 = 2(n_2 - n_0), \text{ and}$$

$$S_3 = 2(n_3 - n_0)$$

where the number of photons, in terms of the right and left circular polarization states, are given by:

$$n_0 = \frac{N}{2}(\langle R|\hat{\rho}|R\rangle + \langle L|\hat{\rho}|L\rangle)$$

$$n_1 = \frac{N}{2}(\langle R|\hat{\rho}|R\rangle + \langle R|\hat{\rho}|L\rangle + \langle L|\hat{\rho}|R\rangle + \langle L|\hat{\rho}|L\rangle)$$

$$n_2 = \frac{N}{2}(\langle R|\hat{\rho}|R\rangle + i\langle R|\hat{\rho}|L\rangle - i\langle L|\hat{\rho}|R\rangle + \langle L|\hat{\rho}|L\rangle)$$

$$n_3 = N(\langle R|\hat{\rho}|R\rangle)$$

Here $\hat{\rho}$ is a 2×2 density matrix representing the polarization degrees of the electromagnetic radiation.

Typically, the Stokes parameters are normalized by dividing each parameter by the parameter $S_0$, which is equivalent to using an incident beam of unit intensity. The Stokes parameters $(S_0, S_1, S_2, S_3)$ for randomly polarized electromagnetic radiation in the normalized representation is (1,0,0,0). The normalized Stokes parameters are listed in Table 1:

TABLE 1

|     | $|H\rangle$ | $|V\rangle$ | $|45°\rangle$ | $|-45°\rangle$ | $|R\rangle$ | $|L\rangle$ |
| --- | --- | --- | --- | --- | --- | --- |
| $S_0$ | 1 | 1 | 1 | 1 | 1 | 1 |
| $S_1$ | 1 | -1 | 0 | 0 | 0 | 0 |
| $S_2$ | 0 | 0 | 1 | -1 | 0 | 0 |
| $S_3$ | 0 | 0 | 0 | 0 | 1 | -1 |

EMBODIMENTS OF THE PRESENT INVENTION

Various embodiments of the present invention are directed to optical-based, self-authenticating QRNGs that can be used to generate a sequence of random binary numbers. Embodiments of the present invention include quantum-mechanical-based methods for constructing the minimum entropy that is used to evaluate, authenticate, and sift the sequence. The present invention is described below with reference to a particular photon polarization states. Note that the present invention is not limited to the use of photon polarization states. Anyone skilled in the art of quantum optics and quantum information can employ the methods and systems of the present invention described using other optical quantum systems, such as which path photons output from a 50:50 beamsplitter or time bin photons.

Figure 11:
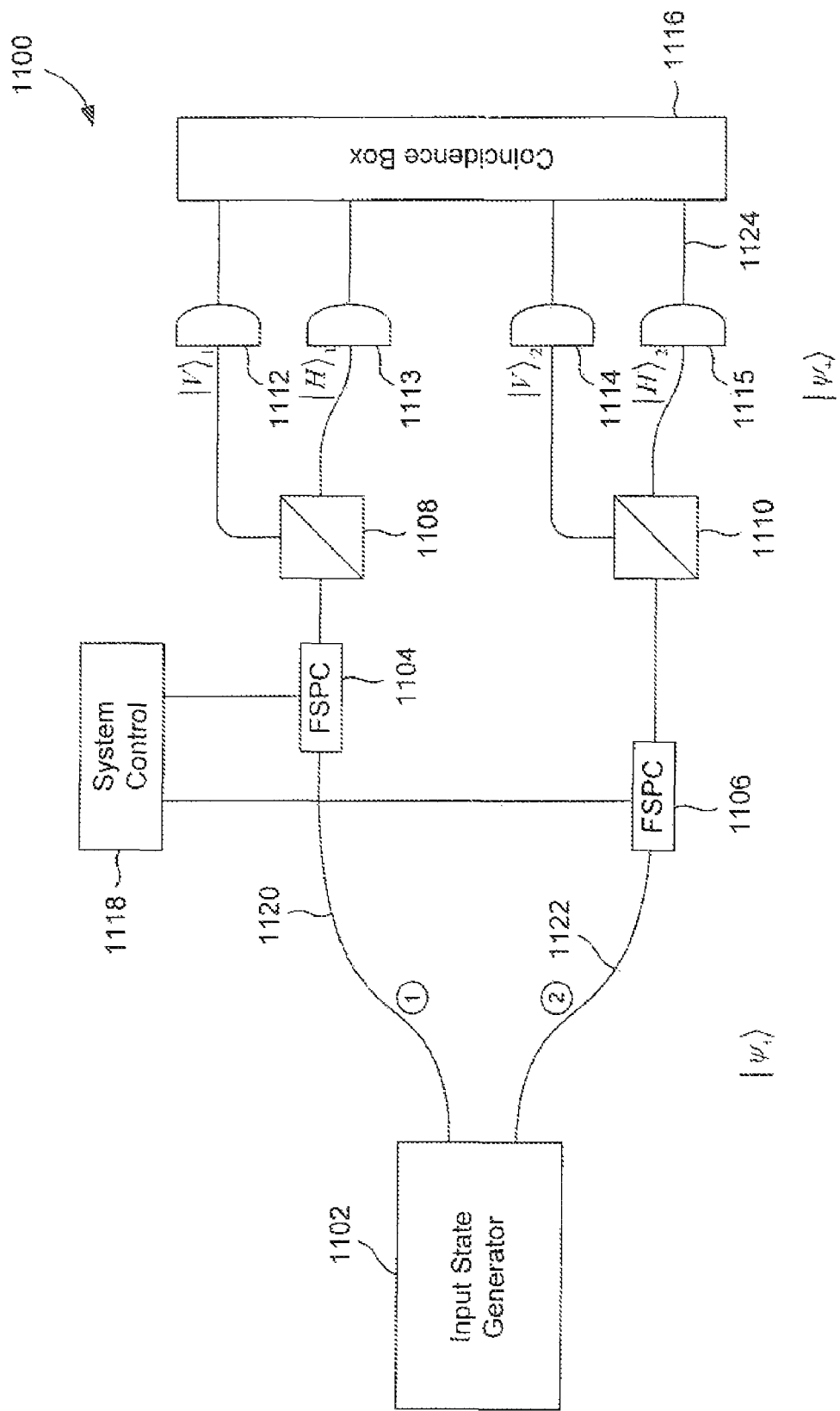
FIG. 11 illustrates an optical-based, quantum random number generator that represents an embodiment of the present invention.

FIG. 11 illustrates an optical-based QRNG 1100 that represents an embodiment of the present invention. As shown in FIG. 11, the QRNG 1100 comprises an input state generator 1102, fiber-squeezer-polarization controllers ("FSPCs") 1104 and 1106, polarizing beamsplitters 1108 and 1110, photon detectors 1112-1115, a coincidence box 1116, and a system control 1118. Optical fiber 1120 connects the input state generator 1102 to the FSPC 1104 and connects the FSPC 1104 to the beamsplitter 1108, and optical fiber 1122 connects the input state generator 1102 to the FSPC 1106 and connects the FSPC 1106 to the beamsplitter 1110. Optical fibers also connect the beamsplitter 1108 to the detectors 1112 and 1113 and the beamsplitter 1110 to the detectors 1114 and 1115. The optical fibers serve as channels for transmitting electromagnetic radiation generated by the input state generator 1102. Electrical signal lines, such as signal line 1124, connect the detectors 1112-1115 to the coincidence box 1116, connect the coincidence box 1116 to the system control 1118, and separately connect the system control 1118 to the FSPCs 1104 and 1106. The coincidence box 1116 transmits signals to the system control 1118, which, in response, transmits signals to the FSPCs 1104 and 1106 to adjust the states of electromagnetic radiation transmitted in the optical fibers 1120 and 1122.

The input state generator 1102 sequentially generates optical quantum systems in the form or pairs of photons in entangled polarization states. A first photon of the pair of photons is output from the input state generator 1102 into the optical fiber 1120 and transmitted through the FSPC 1104 to the beamsplitter 1108, and a second photon of the pair of photons is output from the input state generator 1102 into the optical fiber 1122 and transmitted through the FSPC 1106 to the beamsplitter 1110. The entangled polarization state of the pair of photons is represented by the Bell state:

$$|\psi_+\rangle = \frac{1}{\sqrt{2}}(|H_1 V_2\rangle + |V_1 H_2\rangle)$$

where the pair of photons in the state $|H_1 V_2\rangle$ represents the first photon in a horizontal polarization state $|H\rangle_1$ and the second photon in a vertical polarization state $|V\rangle_2$; and the pair of photons in the state $|V_1 H_2\rangle$ represents the first photon in a vertical polarization state $|V\rangle_1$ and the second photon in a horizontal polarization state $|H\rangle_2$. The beamsplitter 1108 reflects the first photon in the state $|V\rangle_1$ to the detector 1112 and transmits the first photon in the state $|H\rangle_1$ to the detector 1113. The beamsplitter 1110 reflects the second photon in the state $|V\rangle_2$ to the detector 1114 and transmits the second photon in the state $|H\rangle_2$ to the detector 1115.

The entangled pair of photons remains in the Bell state $|\psi_+\rangle$ until the pair of photons are detected at the detectors 1112-1115. Each pair of photons generated by the input state generator 1102 ideally generates a single binary number "0" or "1" as follows. The square modulus of the coefficients of the Bell state $|\psi_+\rangle$ indicates that when the pair of photons reaches the detectors 1112-1115, there is a ½ probability of detecting the state $|H_1 V_2\rangle$ at the pair of detectors 1113 and 1114, and there is a ½ probability of detecting the state $|V_1 H_2\rangle$ at the pair of detectors 1112 and 1115. In other words, detecting the state $|H_1 V_2\rangle$ or the state $|V_1 H_2\rangle$ is a random event. This random event can be used to generate a single random binary number by associating the photon states, $|H_1V_2\rangle$ and $|V_1H_2\rangle$, with a different binary number. For example, detection of the pair of photons in the state $|H_1V_2\rangle$ at the pair of detectors 1113 and 1114 corresponds to the binary number "1," and detection of the pair of photons in the state $|V_1H_2\rangle$ at the pair of detectors 1112 and 1115 corresponds to the binary number "0."

Figure 12:
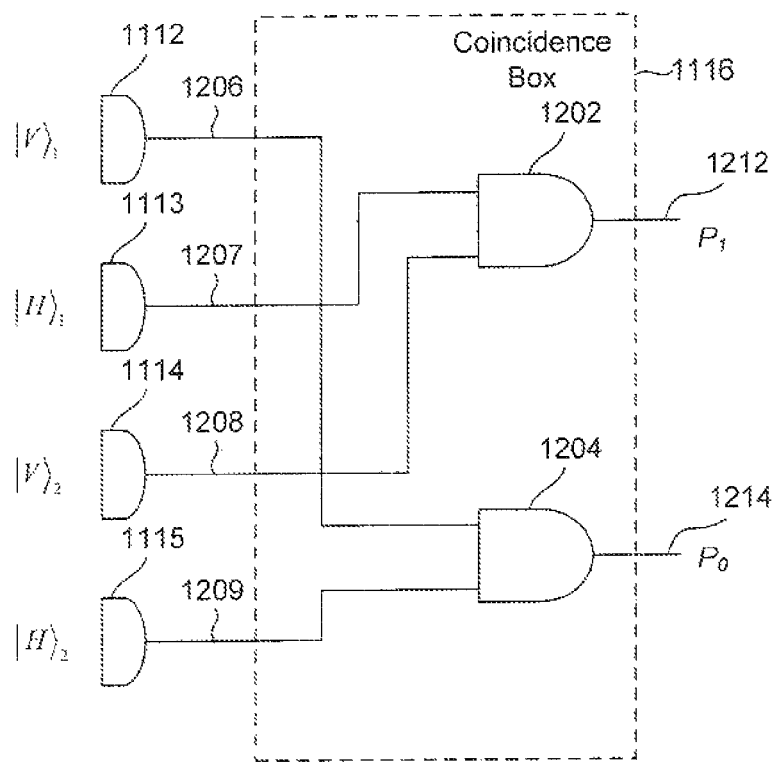
FIG. 12 illustrates interconnections between detectors and a coincidence box of a quantum random number generator that represents an embodiment of the present invention.

FIG. 12 illustrates interconnections between the detectors 1112-1115 and coincidence box 1116 that represents an embodiment of the present invention. In FIG. 12, the coincidence box 1116 includes two AND gates 1202 and 1204, four input signal lines 1206-1209, and two output signals 1212 and 1214. The signal lines 1206 and 1209 connect the detectors 1112 and 1115 to the AND gate 1204, the signal lines 1207 and 1208 connect the detectors 1113 and 1114 to the AND gate 1202, and signal lines 1212 and 1214 respectively connect the AND gates 1202 and 1204 to the system control 1118. Each of the detectors 1112-1115 detect the intensity of the photon reaching the detector and do not distinguish a particular polarization state. When a detector detects a photon, a signal is transmitted to a connected AND gate. The AND gates 1202 and 1204 only output a signal, or pulse, when they each simultaneously receive two input signals, otherwise the AND gates 1202 and 1204 do not output a signal. The signals output by the AND gates 1202 and 1204 are represented by $P_1$ and $P_0$, respectively. For example, when detectors 1112 and 1115 detect a pair of photons in the state $|V_1H_2\rangle$, the detectors 1112 and 1115 simultaneously transmit signals to the AND gate 1204, which responds by outputting a signal $P_0$ to the system control 1118, in FIG. 11.

Figure 13:
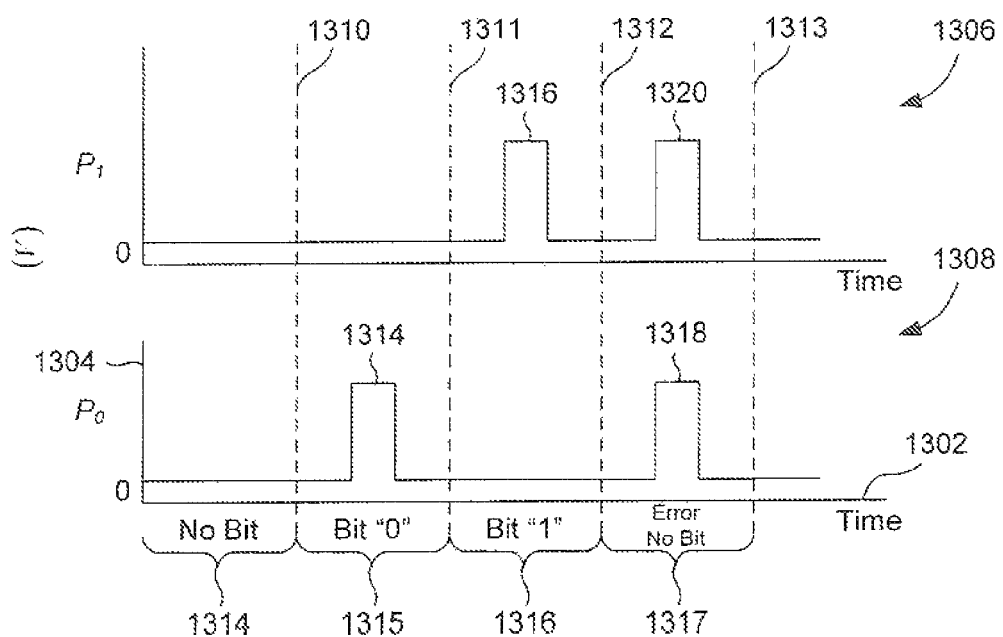
FIG. 13 shows two output signal versus time plots representing four types of output signal combinations that can be received by a system control of a quantum random number generator that represents an embodiment of the present invention.

The system control 1118 receives the output signals $P_0$ and $P_1$ and records the corresponding binary numbers. FIG. 13 shows two output signal versus time plots representing four types of output signal combinations that can be received by the system control 1118 that represents an embodiment of the present invention. In FIG. 13, horizontal lines, such as line 1302, are time axes, and vertical lines, such as vertical line 1304, are voltage axes. Plot 1306 corresponds to the $P_1$ output signal, and plot 1308 corresponds to the $P_0$ output signal. Vertical dashed-lines 1310-1313 identify the upper and lower bounds of time intervals 1314-1317. Within each time interval, the system control 1118 records one of four events, each event is associated with a single pair of photons generated by the input state generator 1102 and is called a "raw count." A signal output by an AND gate is represented by a pulse in the voltage or current, such as pulse 1314. In the time interval 1314, no signal is received by the system control 1118, which may be the result of no photons reaching the detectors 1112-1115, only a single photon reaching one of the detectors, or a pair of photons reaching the detectors 1112-1115 but the pair of photons are neither in the state $|H_1V_2\rangle$ nor in the state $|V_1H_2\rangle$. As a result, the system control 1118 records the raw count "no signal." In the time intervals 1315 and 1316, single pulses 1314 and 1316 are successively input to the system control 1118, which records the raw counts binary number "0" followed by the binary number "1." In the time interval 1317, two pulses 1318 and 1320 are simultaneously received by the system control 1118, which identifies the receipt of two pulses from the AND gates 1202 and 1204 as an "error."

The QRNG 1100 can ideally be used to generate a sequence of random binary numbers by repeatedly preparing pairs of photons, each pair of photons in the Bell state $|\psi_+\rangle$. However, in practice, there may exist any number of perturbations in the process of generating a sequence of random binary numbers, such as the no signal and error described above with reference to FIG. 13, and a number of these perturbations may bias the sequence. As a result, embodiments of the present invention include methods for reducing the sequence of raw counts to a raw sequence of random binary numbers. Quantum-mechanical-based methods are used to evaluate and authenticate the randomness of the raw sequence and remove any bias in the binary numbers from the raw sequence to produce a smaller sequence of random binary numbers.

Figure 14A:
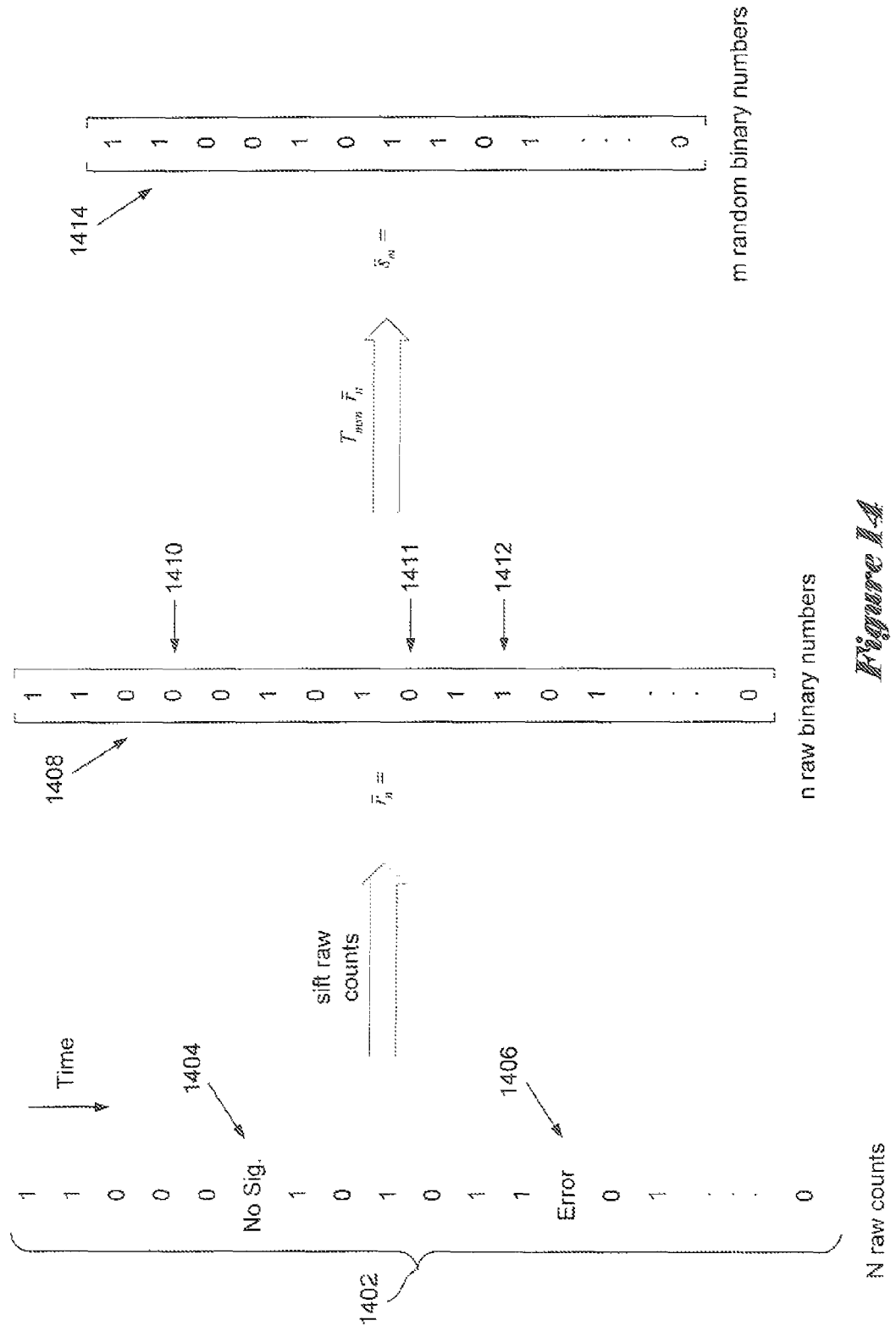
FIG. 14 illustrates generating a sequence of random binary numbers from a sequence of raw counts that represents an embodiment of the present invention.

FIG. 14 illustrates generating a sequence of random binary numbers from a sequence of raw counts generated by hypothetically operating the QRNG 1100 N times that represents an embodiment of the present invention. In FIG. 14, a sequence of N raw counts 1402 includes sequences of binary numbers "0" and "1" separated by a raw count no signal 1404 and raw count error 1406. The raw counts corresponding to the no signal 1404 and the error 1406 are removed from the sequence of raw counts 1402 to produce raw sequence of n random binary numbers, where n<N. In FIG. 14, the raw sequence of random binary numbers are assembled into a column vector 1408 denoted by $\vec{r}_n$. The raw sequence 1408 includes a number of hypothetical biased binary numbers, such as biased binary numbers 1410-1412. Quantum-mechanical-based methods of the present invention are used to construct an m×n Toeplitz matrix $T_{n \times m}$ that is used to sift out the biased binary numbers in the raw sequence 1408 to produce sequence of m sifted random binary numbers as follows:

$$\vec{s}_m = T_{n \times m} \vec{r}_n$$

where $m \leq n \leq N$. The sequence of random binary numbers $\vec{s}_m$ is represented by a column vector 1414. Barak et al., "True Random Number Generators Secure in a Changing Environment," in "Cryptographic Hardware and Embedded Systems CHES 2003," C. D. Walter et al. (Eds.) pp 166-180, Springer-Verlag (2003) provides a definition of the Toeplitz matrix. The following discussion provides the insight needed to construct the Toeplitz matrix as it relates the methods of the present invention in accordance with the Barak reference.

The quantum-mechanical-based methods for generating a sequence of random binary numbers are described below with reference to an adversarial scenario. In the following adversarial scenario, the input state generator 1102 falls under the control of an adversary, called "Eve." Eve wants to generate a sequence that appears random to a QRNG 1100 user, called "Alice," but is at least partially known to her. Because Alice generates the random binary numbers using only the states $|H_1V_2\rangle$ and $|V_1H_2\rangle$ the following analysis is restricted to a subspace spanned by the states $|H_1V_2\rangle$ and $|V_1H_2\rangle$. Therefore it assumed that Eve generates entangled states of the form:

$$|\psi_i\rangle = \alpha_i |H_1V_2\rangle + \beta_i |V_1H_2\rangle$$

where $|\alpha_i|^2 + |\beta_i|^2 = 1$, $0 \leq |\alpha_i|^2 \leq 1$, and $0 \leq |\beta_i|^2 \leq 1$ Alice has control of the QRNG 1100 except for the input state generator 1102 controlled by Eve. Eve is assumed to have no knowledge of the measurements Alice applies to each pair of photons. When Eve prepares a single photon pairs in a pure state $|\psi_i\rangle$, Alice can determine a density matrix associated with the measurement:

$$\hat{\rho} = \begin{bmatrix} |\alpha_i|^2 & \alpha_i \beta_i^* \\ \alpha_i^* \beta_i & |\beta_i|^2 \end{bmatrix}$$

The density matrix $\hat{\rho}$ represents the maximum amount of information Alice can obtain about the state the photon pairs she is provided by Eve. Alice can determine the elements of the density matrix $\hat{\rho}$ by performing tomographic analysis on pairs of photons provided by Eve. The tomographic analysis is used to evaluate the randomness of a sequence of random numbers and is referred to as "self-authentication." Tomographic analysis of quantum states is well-known in the art and is described, for example, by James et al., "Measurement of Qubits," Phys. Rev. A, Vol. 64, 052312. Tomographic analysis is used to identify the states $|\psi_i\rangle$ prepared by Eve. As described in the James et al. reference, tomographic analysis for a b-qubit system typically requires $(4^b-1)$ different expectation values to determine the density matrix $\hat{\rho}$. As a result, numerous copies of identical states are needed for measurements of the expectation values. The $(4^b-1)$ different expectation values and the normalization requirement for the states ideally generates $4^b$ independent restrictions on $2^b$ complex coefficients of a general b-qubit system, permitting an analytic solution for the density matrix $\hat{\rho}$ and/or $2^b$ complex coefficients defining the measured state. Tomographic analysis for the 2-qubit polarized photon pairs generated by the QRNG 1100 requires 16 independent expectation values.

Eve may attempt to bias a sequence in a way that is known to her but appears random to Alice by transmitting pairs of photons in a statistical mixture of the states $|\psi_i\rangle$, each state having an associated probability $p_i$. Alice performs tomographic analysis to determine the density matrix operator:

$$\hat{\rho} = \sum_i p_i |\psi_i\rangle\langle\psi_i|$$

and the associated density matrix:

$$\hat{\rho} = \begin{bmatrix} \sum_i p_i |\alpha_i|^2 & \sum_i p_i \alpha_i \beta_i^* \\ \sum_i p_i \alpha_i^* \beta_i & \sum_i p_i |\beta_i|^2 \end{bmatrix}$$

where $$\sum_i p_i |\alpha_i|^2 = Pr_{HV}$$

is the probability of measuring the state $|H_1 V_2\rangle$; and $$\sum_i p_i |\beta_i|^2 = Pr_{VH}$$

is the probability of measuring the state $|V_1 H_2\rangle$.

The density matrix operator and the density matrix are compositions of pure state density matrix operators and associated density matrices. Note that although Eve prepares and knows the state $|\psi_i\rangle$ of each pair of photons that Alice is measuring each time, Eve cannot control the outcome of Alice's measurement on a pure state $|\psi_i\rangle$, because the outcome of each measurement performed by Alice is governed by the laws of quantum mechanics.

Alice performs the tomographic analysis to determine the density matrix $\hat{\rho}$ and to evaluate the quality of a source of randomness. The quality of a source of randomness can be strictly evaluated using a minimum entropy ("min-entropy") function defined as follows:

$$H_{Min}(X) \equiv -\log_2\left(\max_{x \in X} Pr(x)\right)$$

where

X is a random variable;

Pr(x) is the probability of a event x; and $$\max_{x \in X} Pr(x)$$

means the maximum probability Pr(x) over every event x in X.

Figure 15:
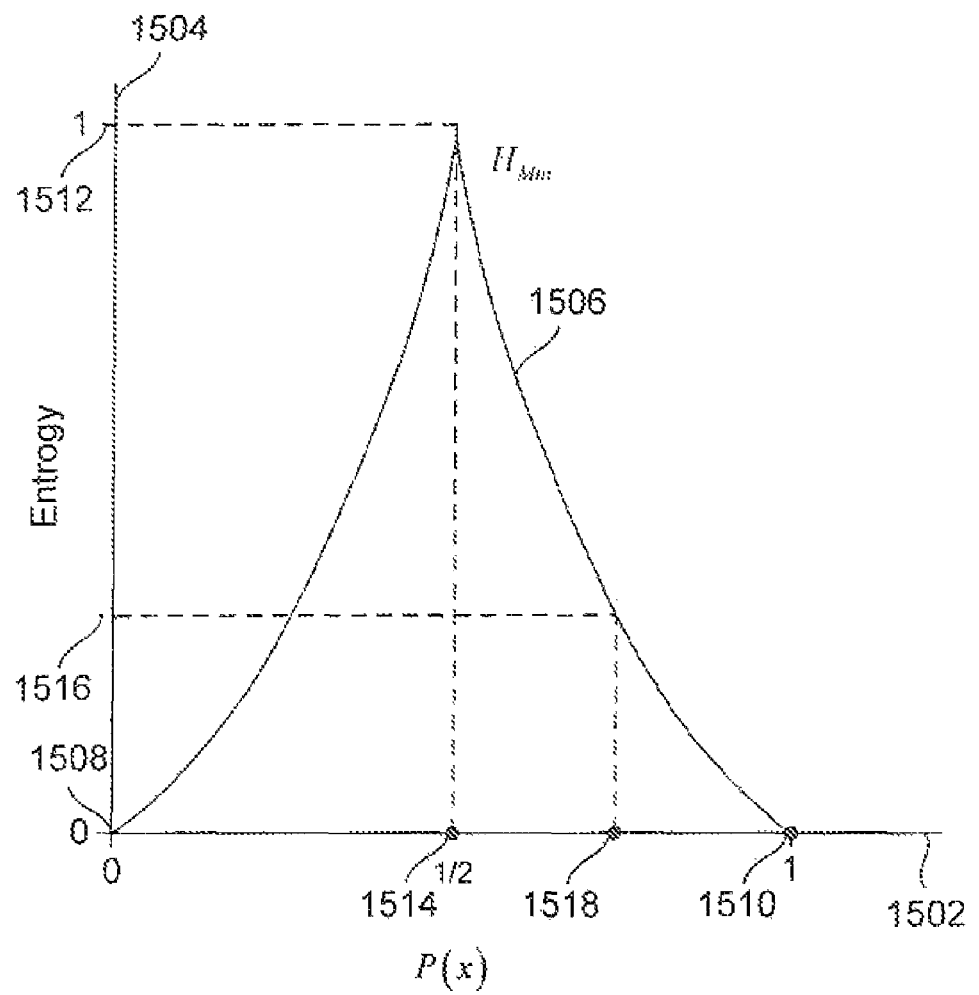
FIG. 15 is a minimum entropy plot that represents an embodiment of the present invention.

In other words, the min-entropy can be thought of as a measure of the amount of randomness in a probability distribution. FIG. 15 is a plot of the min-entropy that represents an embodiment of the present invention. In FIG. 15, horizontal axis 1502 corresponds to the probability Pr(x) of the event x, vertical axis 1504 represents values of the min-entropy, and curve 1506 represents the min-entropy $H_{Min}(X)$. When the min-entropy is "0" 1508, the maximum probability Pr(x) of the event x occurring is "1" 1510. The event x occurs with certainty and is a completely deterministic event. When the min-entropy is "1" 1512, the maximum probability Pr(x) of the event x occurring is "½" 1514. The event x occurs without bias and corresponds to a truly random event. When the min-entropy is between "0" and "1," such as point 1516, the maximum probability of the event x occurring is greater than ½, represented by point 1518.

In order to demonstrate use of the min-entropy, the following discussion describes how the elements of the density matrix are used in the definition of the min-entropy for three different kinds of ensembles of states generated by Eve. When Alice performs tomographic analysis on a single pair of photons in a pure state $|\psi\rangle$ provide by Eve, the random variable X is distributed over the set $\{0, 1\}$, and the min-entropy is:

$$H_{Min}(|\psi\rangle\langle\psi|) = -\log_2(\max(Pr_{HV}(|\psi\rangle), Pr_{VH}(|\psi\rangle)))$$

where $Pr_{HV}(|V\psi\rangle) = |\alpha|^2 = |\langle H_1 V_2 | \psi\rangle|^2$, and $Pr_{VH}(|\psi\rangle) = |\beta|^2 = |\langle V_1 H_2 | \psi\rangle|^2$ The min-entropy can be extended to the case when Alice performs tomographic analysis on n pairs of photons all in the same pure state $|\psi\rangle$ provided by Eve. The random variable X is distributed over the set $\{0,1\}^n$, and the min-entropy is:

$$H_{Min}((|\psi\rangle\langle\psi|)^n) = -n \log_2(\max(Pr_{HV}(|\psi\rangle), Pr_{VH}(|\psi\rangle)))$$

Finally, when Alice performs tomographic analysis on n pairs of photons in a statistical mixture of pure states $|\psi_i\rangle$ provided by Eve, the min-entropy is:

$$H_{Min}\left(\left(\sum_i p_i |\psi_i\rangle\langle\psi_i|\right)^n\right) = -n\sum_i p_i \log_2(\max(Pr_{HV}(|\psi_i\rangle),$$

$$Pr_{VH}(|\psi_i\rangle)))$$

where $$Pr_{HV}(|\psi_i\rangle) = \sum_i p_i |\alpha_i|^2, \text{ and}$$

$$Pr_{VH}(|\psi_i\rangle) = \sum_i p_i |\beta_i|^2$$

Alice does not know the decomposition of the states of the pairs of photons Eve is providing. Alice only has access to the density matrix $\hat{\rho}$ she generates during tomographic analysis. In order to obtain an extension of the min-entropy to arbitrary states, the min-entropy associated with pairs of photons is defined as the minimum min-entropy over all the possible decompositions of the density matrix $\hat{\rho}$. Using such a definition of the minimum min-entropy places an upper bound on the amount of information Eve can obtain about Alice's sequence.

Note that as long as the min-entropy $H_{Min}$ is not equal zero, Eve does not have complete control over the sequences of binary numbers produced by the QRNG 1100. In other words, as long as the min-entropy is greater than zero, there exists some number m of random binary numbers within a sequence of n binary numbers generated by the QRNG 1100, where m<n.

Because Alice measures intensities at the detectors 1112-1115, in FIG. 11, the min-entropy $H_{Min}(\hat{\rho})$ can be re-characterized as a function of the Stokes parameters. Stokes parameters are used here to characterize a 2 dimensional space spanned by the vectors $|H_1V_2\rangle$ and $|V_1H_2\rangle$, which is isomorphic to the space of the polarization of a single photon. The 2×2 density matrix $\hat{\rho}$ associated with a statistical mixture of states $|\psi_i\rangle$ above can be rewritten in terms of the Stokes parameters $(S_0, S_1, S_2, S_3)$ as follows:

$$\hat{\rho}_S = \frac{1}{2}\sum_{i=0}^{3}\frac{S_i}{S_0}\sigma_i$$

$$= \frac{1}{2}\begin{bmatrix} 1+S_3 & S_1 - iS_2 \\ S_1 + iS_2 & 1 - S_3 \end{bmatrix}$$

where subscript "S" identifies the density matrix rewritten in terms of the Stokes parameters;

the Stokes parameter $S_0$ is normalized "1"; and and $\sigma_1, \sigma_2$, and $\sigma_3$ are the Pauli matrices.

For a statistical mixture of states, the matrix elements of the density matrix $\hat{\rho}$ equal the matrix elements of the density matrix $\hat{\rho}_S$, where the diagonal elements are related as follows:

$$Pr_{HV}(|\psi_i\rangle) = \frac{1+S_3}{2}, \text{ and}$$

$$Pr_{VH}(|\psi_i\rangle) = \frac{1-S_3}{2}$$

Figure 16:
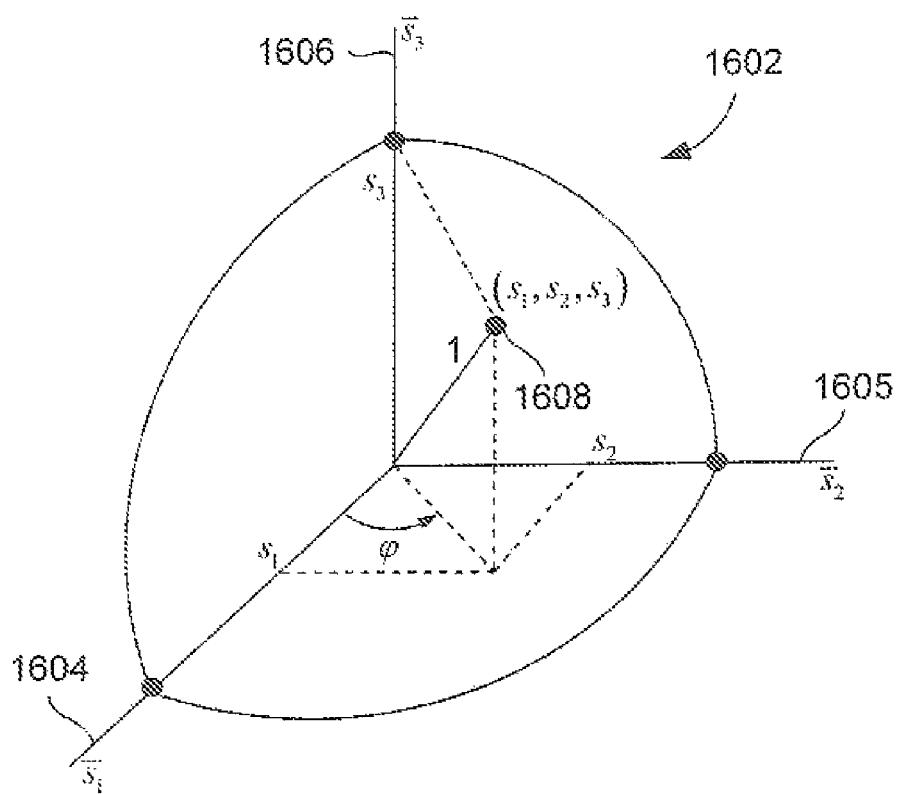
FIG. 16 shows a set of Stokes parameters of a pure state located on the surface of a Poincare sphere.

A pure state with the density matrix $\hat{\rho}_S$ lies on the surface of the Poincare sphere. FIG. 16 shows the Stokes parameters of a pure state located on the surface of a Poincare sphere. In FIG. 16, only a single quadrant 1602 of the Poincare sphere is shown. Lines 1604-1606 represent orthogonal coordinates axes $\underline{S}_1, \underline{S}_2$, and $\underline{S}_3$, respectively, and a point 1608 with coordinates $(S_1, S_2, S_2)$ is located on the surface of the Poincare sphere. The Poincare sphere is of unit radius:

$$S_1^2 + S_2^2 + S_3^2 = 1$$

For a pure state located on the surface of the Poincare sphere, the parameter $S_3$ is related to the parameters $S_1$ and $S_2$ as follows:

$$S_1 = \sqrt{1 - S_3^2}\cos\varphi$$
$$= \sqrt{4Pr_{HV}(1 - Pr_{HV})}\cos\varphi$$
$$S_2 = \sqrt{1 - S_3^2}\sin\varphi$$
$$= \sqrt{4Pr_{HV}(1 - Pr_{HV})}\sin\varphi$$

By defining the following real valued function for all density matrices $\hat{\rho}_S$:

$$f(\hat{\rho}_S) = -\log_2\left(\frac{1 + \sqrt{1 - |S_1 + iS_2|^2}}{2}\right)$$

the following theorem can be stated:

Theorem 1. The min-entropy of a system described by a density matrix $\hat{\rho}_S$ is $$H_{Min}(\hat{\rho}_S) = f(\hat{\rho}_S)$$

Proof of the Theorem 1 is provided in an appendix below. The Theorem 1 demonstrates that a measurement of the density matrix of the states used to generate a sequence of binary numbers has an upper bound on the amount of information an adversary, such as Eve, can obtain. The Barak et al. reference shows that given a sequence of n binary numbers with a min-entropy $H_{Min}$, one can extract m random binary numbers, where m<n. The m random binary numbers are distributed according to a distribution, which is arbitrarily close to a uniform distribution of binary numbers.

Figure 17:
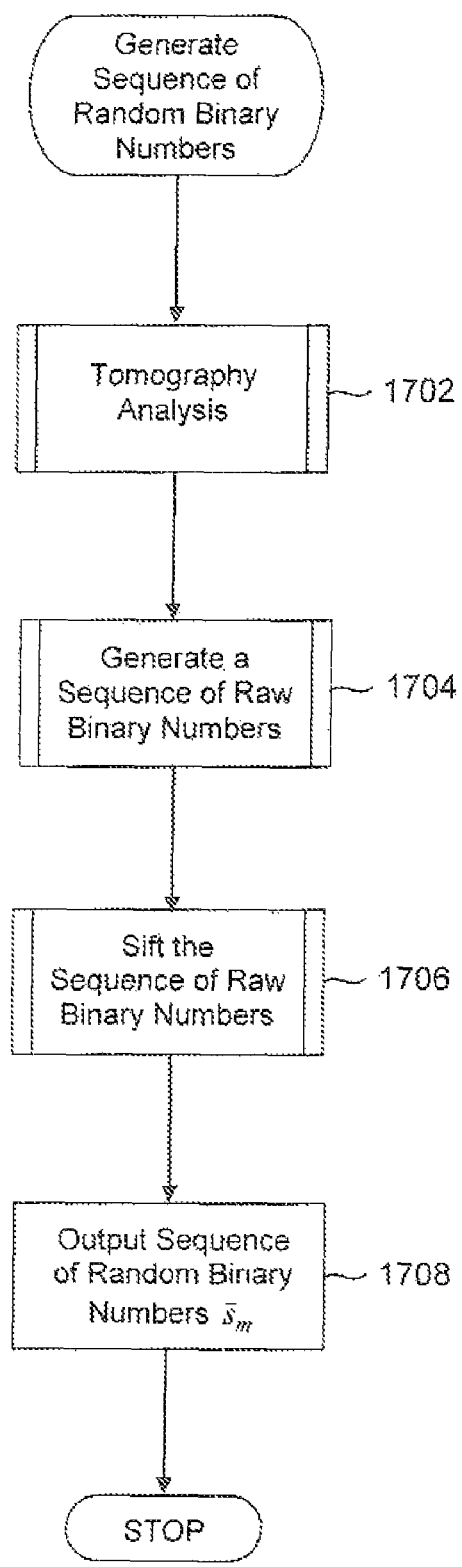
FIG. 17 shows a control-flow diagram that represents one of many embodiments of the present invention for generating a sequence of random binary numbers.

FIG. 17 shows a control-flow diagram that represents one of many embodiments of the present invention for generating sequences of random binary numbers. In step 1702, the routine "tomographic analysis" is called. The routine tomographic analysis is a method for determining a density matrix $\hat{\rho}_S$ and the min-entropy $H_{Min}(\hat{\rho}_S)$. In step 1704, the routine "generate a sequence of raw binary numbers" is called, which generates a raw sequence of n random binary numbers $\vec{r}_n$, as described above with reference to FIG. 14. In step 1706, the routine "sift the sequence of raw binary numbers" is called, which employs the min-entropy $H_{Min}$, determined in the step 1702, to remove bias from the sequence $\vec{r}_n$ and produce a smaller sequence of m random binary numbers $\vec{s}_m$. In step 1708, the sequence of random binary numbers $\vec{s}_m$ is output.

Figure 18:
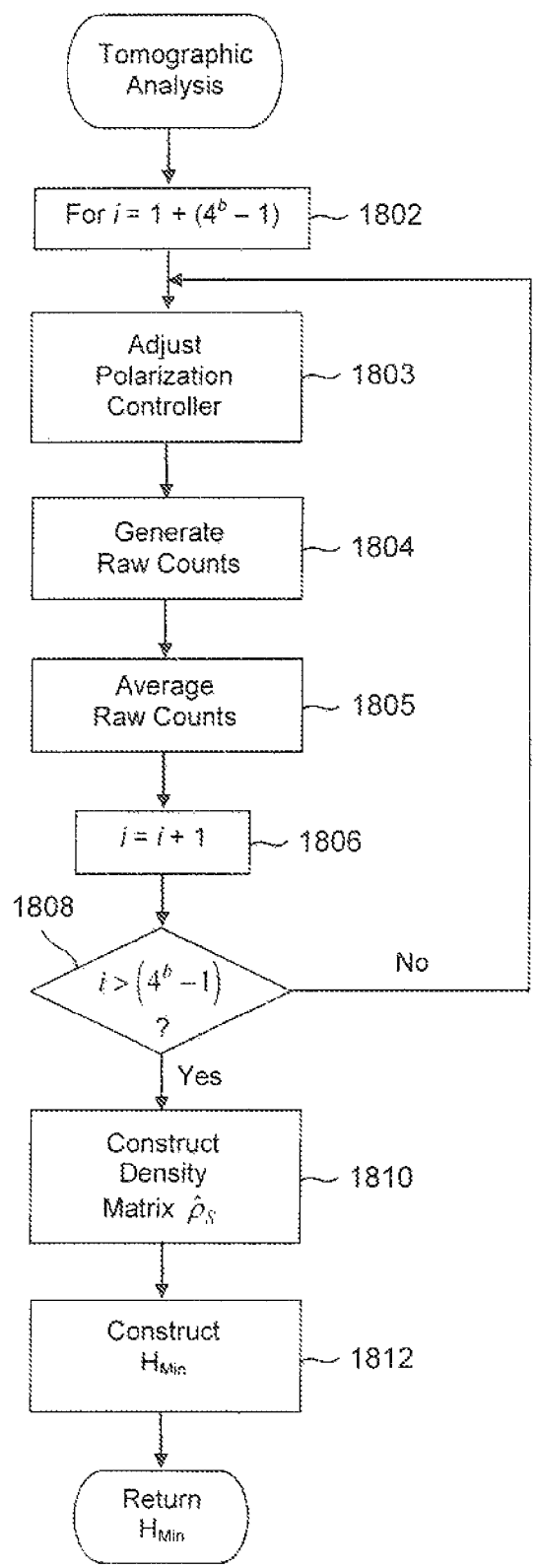
FIG. 18 shows a control-flow diagram for the routine "tomographic analysis" called in step 1702, in FIG. 17, that represents one of many embodiments of the present invention.

FIG. 18 shows a control-flow diagram for the routine "tomographic analysis" called in step 1702 in FIG. 17 and represents one of many embodiments of the present invention. In the for-loop beginning in step 1802, steps 1803-1806 are repeated in order to generate a density matrix $\hat{\rho}_S$ in step 1810 and the min-entropy $H_{Min}(\hat{\rho}_S)$ in step 1812. In step

1803, polarization controllers, such FSCPS 1104 and 1106 in FIG. 11, are adjusted to match a pre-determined value that depends on the index i. In step 1804, a sequence of raw counts is generated, as described above with reference to FIG. 13. In step 1805, running averages of the four different kinds of raw counts are maintained. In step 1806, the index i is incremented. In step 1808, when the index i is greater than ($4^b-1$), control passes to step 1810, otherwise steps 1803-1806 are repeated. In step 1810, the density matrix bs is constructed as described in the James et al. reference. In step 1812, the density matrix $\hat{\rho}_S$ is used to construct the min-entropy $H_{Min}(\hat{\rho}_S)$.

Figure 19:
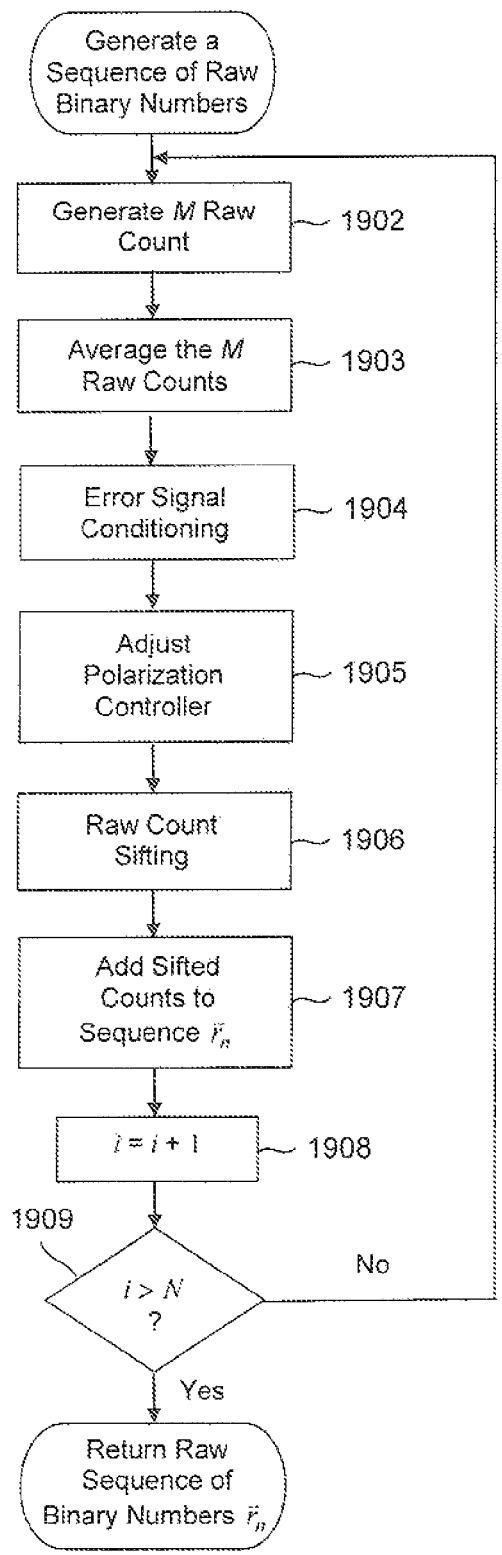
FIG. 19 shows a control-flow diagram for the routine "generate a sequence of raw binary numbers" called in step 1704, in FIG. 17, that represents one of many embodiments of the present invention.

FIG. 19 shows a control-flow diagram for the routine "generate a sequence of raw binary numbers" called in step 1704 in FIG. 17 and represents one of many embodiments of the present invention. In the loop beginning in step 1902, steps 1902-1908 are repeated until the index i, which corresponds to the length of the raw sequence is equal or greater than a pre-assigned length N. In step 1902, M raw count are generated. In step 1903, averages of the raw counts corresponding to "0" and "1" are determined. In step 1904, the averages are used to calculate an error signal that detects birefringence defects introduced by the optical fibers. In step 1905, the error signal is used to adjust the FSPCs and correct the birefringence errors. The system control may include software or firmware that enables the system control to adjust the polarization states of the pairs of photons transmitted in the optical fibers. Shimizu et al., "Highly Practical Fiber Squeezer Polarization Controller," J. of Lightwave Technology, Vol. 9, No. 10 (1991) describes operation of the FSPCs to control the polarization state of photons. In step 1906, the raw count is sifted by discarding the raw count that correspond to either no signals or errors leaving a raw sequence of random binary numbers, as described above with reference to FIG. 14. In step 1907, the raw sequence of binary numbers is added to the sequence $\vec{r}_n$. In step 1908, the length index i is incremented. In step 1909, when the index i is greater than or equal to N, control passes to step 1902, otherwise the raw sequence of random binary numbers $\vec{r}_n$ is output.

Figure 20:
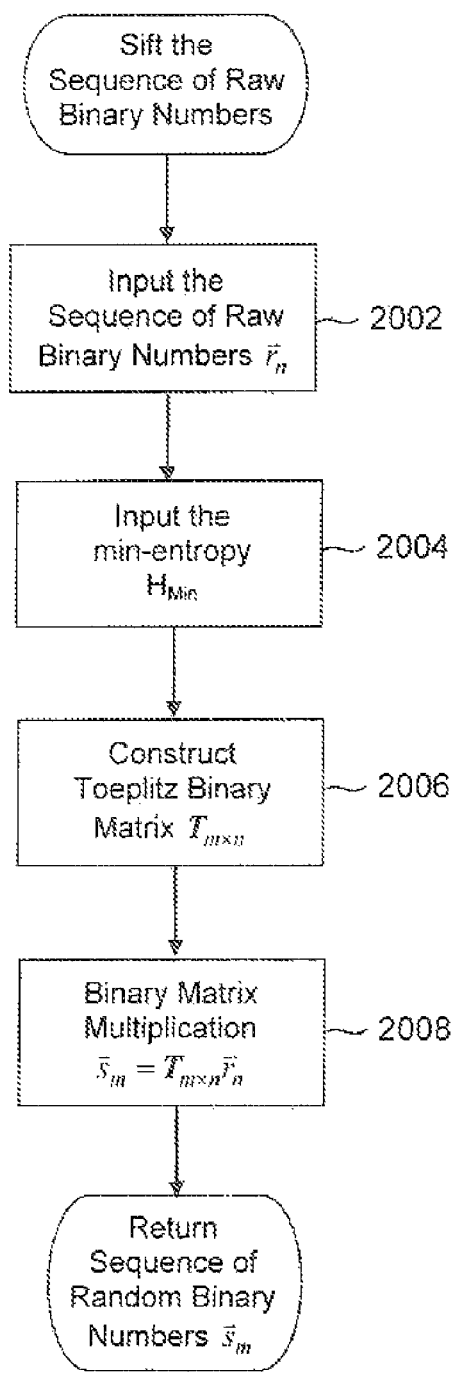
FIG. 20 is a control-flow diagram for the routine "sift the sequence of raw binary numbers" called in step 1706, in FIG. 17, that represents one of many embodiments of the present invention.

FIG. 20 is a control-flow diagram for the routine "sift the sequence of raw binary numbers" called in step 1706, in FIG. 17, and represents one of many embodiments of the present invention. In step 2002, the raw sequence of random binary numbers $\vec{r}_n$ generated in the routine "generate a raw sequence" in FIG. 19 is input. In step 2004, the min-Entropy generated in the routine "tomographic analysis" in FIG. 18 is input. In step 2006, the Toeplitz matrix $T_{n \times m}$ is constructed, as described in the Barak reference. In step 2008, a sequence $\vec{s}_m$ is determined and output in step 1708, in FIG. 17, as described above with reference to FIG. 14.

Based on the Barak et al. reference the maximum number of binary numbers that can be extracted from a raw sequence of n ramadom binary numbers is:

$$m = kn - 4\log_2\left(\frac{1}{\varepsilon}\right) - 2$$

where $\varepsilon$ is a statistical distance between a distribution of m binary numbers and a uniform distribution. The statistical distance is defined mathematically as:

$$\varepsilon = \frac{1}{2}\sum_a |Pr(X=a) - Pr(W=a)|$$

where X and W denote different distributions. The yield Y is the fraction of random binary numbers m/n that can be obtained from a raw sequence of random binary numbers. To test the method for extracting a sequence of random binary numbers $\vec{s}_m$, a sequence of n=3200 raw binary numbers generated by the QRNG 1100 was produced using a statistical distance of $\varepsilon=2^{-35}$ and min-entropy of 0.38. The yield obtained was 0.33. The statistical distance and number of raw binary numbers can be changed by the QRNG 1100 operator to accommodate different security needs and computational resources.

Figure 21:
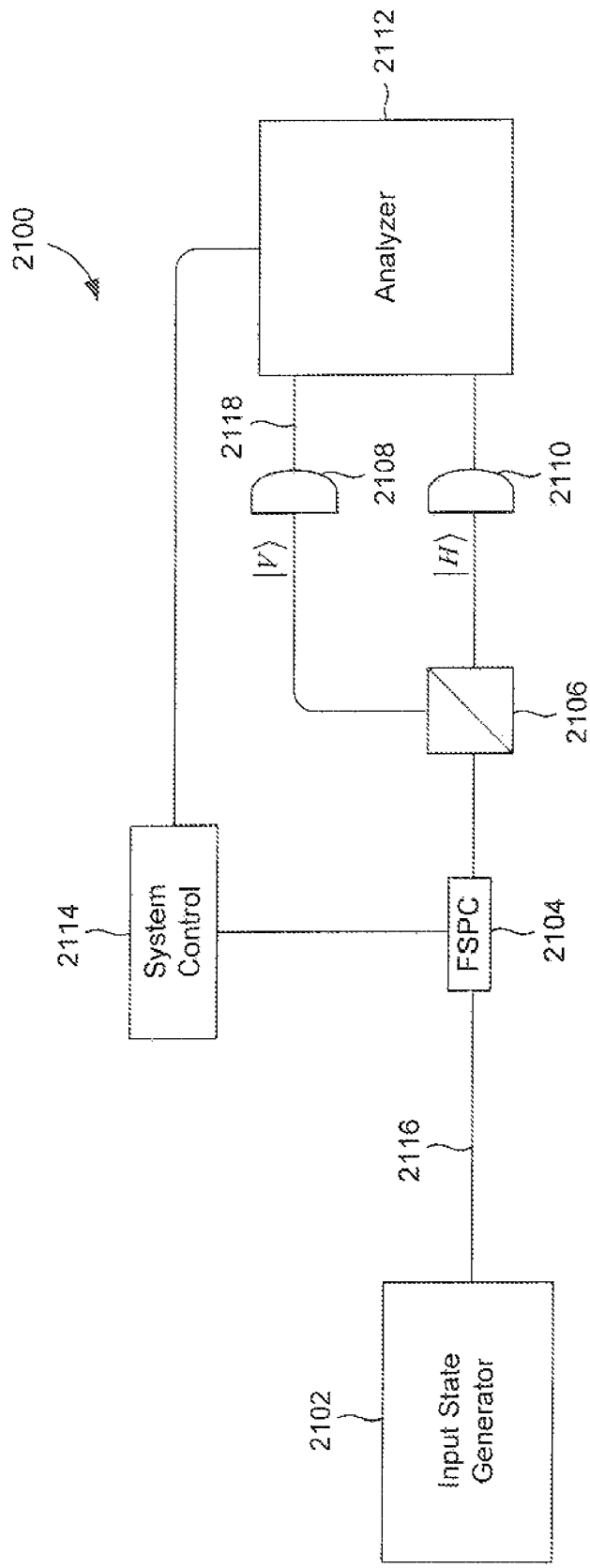
FIG. 21 illustrates an optical-based quantum random number generator that uses single photon states to generate sequences of random numbers that represents an embodiment of the present invention.

In an alternate embodiment of the present invention, tomographic analysis can also be applied to QRNGs that are based on generating sequences of random numbers using photons in a single photon state. FIG. 21 illustrates an optical-based QRNG 2100 that uses single photon states to generate sequences of random numbers and that represents an embodiment of the present invention. As shown in FIG. 21, the QRNG 2100 comprises an input state generator 2102, an FSPC 2104, a polarizing beamsplitter 2106, two photon detectors 2108 and 2110, an analyzer 2112, and a system control 2114. Optical fibers, such as optical fiber 2116, connect the input state generator 2102 to the FSPC 2104 and connect the FSPC 2104 to the beamsplitter 2106. Optical fibers also connect the beamsplitter 2106 to the detectors 2108 and 2110. Electrical signal lines, such as signal line 2118, connect the detectors 2108 and 2110 to the analyzer 2112, connect the analyzer 2112 to the system control 2114, and connect the system control 2114 to the FSPC 2104.

The input state generator 2102 generates and sequentially outputs photons in a linear superposition of vertical and horizontal polarization states given by:

$$|\xi\rangle = a|H\rangle + b|V\rangle$$

where $|a|^2+|b|^2=1$. The beamsplitter 2106 reflects the polarization state $|V\rangle$ to the detector 2108 and transmits the polarization state $|H\rangle$ to the detector 2110. Each photon ideally remains in the state $|\xi\rangle$ until detected at the detectors 2108 and 2110. When a photon is detected at the detectors 2108 and 2110, the analyzer transmits a pulse identifying which detector detected a photon to the system control 2114. As described above with reference to FIG. 13, analyzer 2112 transmits information identifying the different kinds of raw counts.

As described above in the adversarial scenario, Eve desires to generate biased sequences of binary numbers by preparing photons in the state:

$$|\xi_i\rangle = a_i|H\rangle + b_i|V\rangle$$

where
$|a_i|^2 + |b_i|^2 = 1$,
$0 \le a_i|^2 \le 1$, and
$0 < |a_i|^2 \le 1$

When Alice performs tomographic analysis on n photons in a statistical mixture of pure states $|\xi_i\rangle$ provided by Eve, the min-entropy is given by:

$$H_{Min}\left(\left(\sum_i p_i|\xi_i\rangle\langle\xi_i|\right)^n\right) = -n\sum_i p_i\log_2(\max(Pr_H(|\xi_i\rangle), Pr_V(|\xi_i\rangle)))$$

where $$Pr_H(|\psi_i\rangle) = \sum_i p_i|a_i|^2, \text{ and}$$

$$Pr_V(|\xi_i\rangle) = \sum_i p_i|b_i|^2$$

The methods described above with reference to FIGS. 17-20 can be used to generate a sequence of random binary numbers $\vec{s}_m$ using the QRNG 2100.

Figure 22:
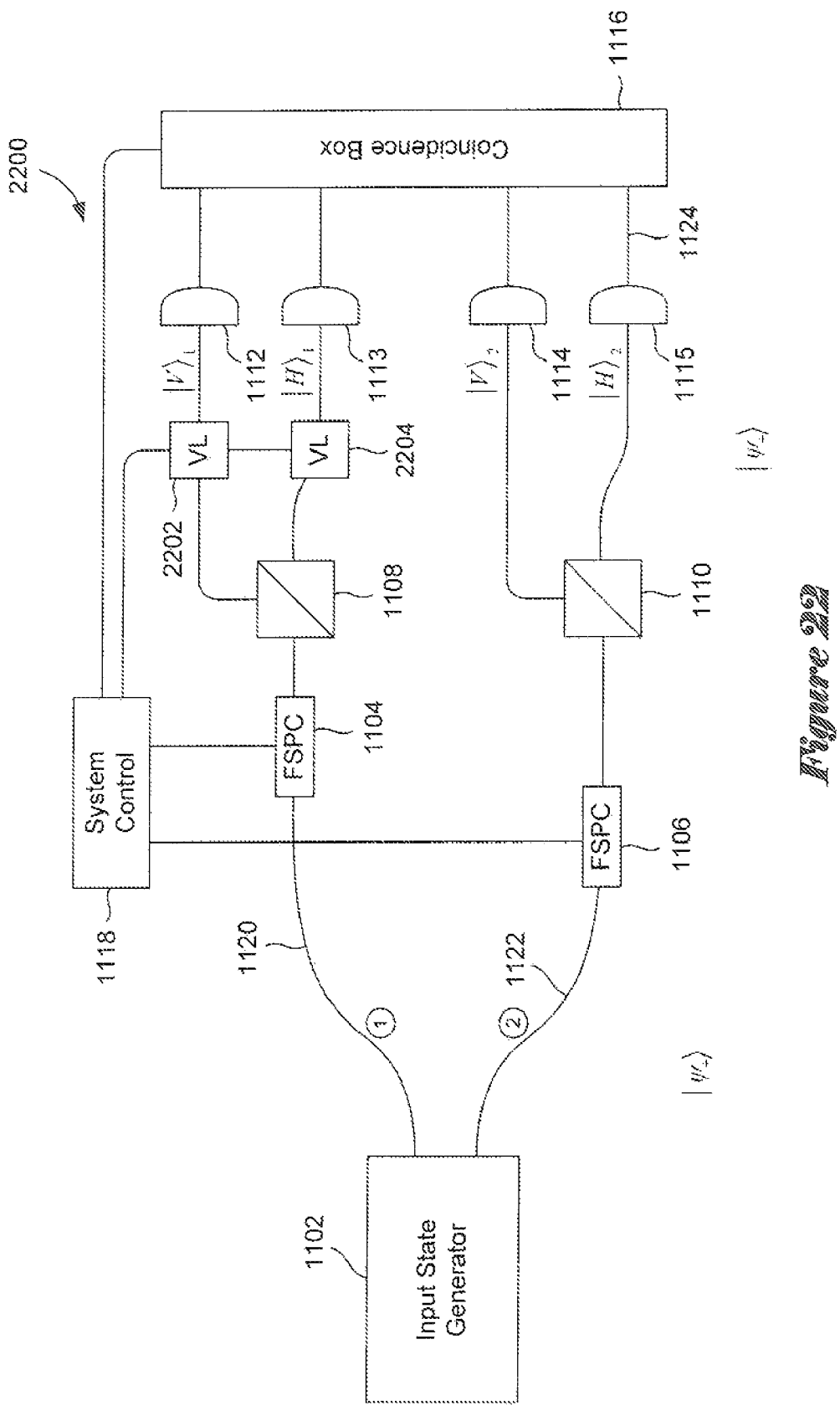
FIG. 22 illustrates an optical-based quantum random number generator that includes variable losses that represents an embodiment of the present invention.

In an alternate embodiment of the present invention, variable losses may be added to the QRNGs 1100 and 2100 in order to adjust the probabilities associated with polarization states at the detectors. For example, FIG. 22 illustrates an optical-based QRNG 2200 that includes variable losses and that represents an embodiment of the present invention. As shown in FIG. 22, the QRNG 2200 is the same as the QRNG 1100, in FIG. 11, except the QRNG 2200 includes variable losses 2202 and 2204. The variable losses are adjusted by the system control 1118, based on the average number of "0s" and "1s" detected. For example, when the average number of "0s" detected is larger than the average number of "1s" detected, the system control 1118 directs the variable loss 2202 to reduce the number of photons in the state $|V\rangle_1$, which has the effect of reducing the number of pairs of photons detected in the state $|V_1H_2\rangle$. In general, the operation carried out by the variable losses on the states $|\psi_i\rangle$ can be represented by:

$$|\psi_i\rangle = \alpha_i|H_1V_2\rangle + \beta_i|V_1H_2\rangle$$

$$\rightarrow \frac{1}{\sqrt{2}}|H_1V_2\rangle + \frac{1}{\sqrt{2}}|V_1H_2\rangle$$

As a result, the variable losses increase the min-entropy. The pairs of photons whose density matrix is:

$$\hat{\rho}_S = \frac{1}{2}\begin{bmatrix} 1+S_3 & S_1-iS_2 \\ S_1+iS_2 & 1-S_3 \end{bmatrix}$$

and min-entropy is:

$$H_{Min}(\hat{\rho}_S) = -\log_2\left(\frac{1+\sqrt{1-4C^2}}{2}\right)$$

where $C=|S_1+iS_2|^2$ are referred to as "uncorrected photon pairs." Assuming that $1+S_3 \geq 1-S_3$, correcting the states of the photon pairs requires adding losses to one of the channels. For example, if the matrix elements $1+S_3$ represents the probability associated with a pair of photons in the state $|H_1V_2\rangle$ variable losses are applied to the optical fiber that carries the polarization state $|H\rangle_1$. Which polarization state receives the variable loss is not unique. The variable loss can also be applied to the optical fiber that carries the polarization state $|V\rangle_2$ to also lower the probability of detecting photon pairs in the state $|H_1V_2\rangle$. In order to correct, or unbias, the entangled states produced in the input state generator 1102, a loss coefficient:

$$\eta = \frac{1-S_3}{1+S_3}$$

is needed. The normalized density matrix for the unbiased state is:

$$\hat{\rho}'_S = \frac{1}{2}\begin{bmatrix} (1+S_3)\frac{1+\eta}{2} & (S_1-iS_2)\frac{1+\eta}{2\sqrt{\eta}} \\ (S_1+iS_2)\frac{1+\eta}{2\sqrt{\eta}} & (1-S_3)\frac{1+\eta}{2\eta} \end{bmatrix}$$

and the associated min-entropy is:

$$H_{Min}(\hat{\rho}'_S) = -\log_2\left(\frac{1+\sqrt{1-C^2\frac{(1+\eta)^2}{\eta}}}{2}\right)$$

In the case of the uncorrected states, the fraction of random binary numbers that can be obtained is:

$$Y_U = H_{Min}(\hat{\rho}_S) - K_e$$

where $K_e$ is an overhead introduced by the sifting the raw sequence of random binary numbers describe in Barak et al. Taking into account the loss $\eta$ the yield is:

$$Y_C = \eta_l \frac{2\eta}{\eta+1} H_{Min}(\hat{\rho}'_S) - K_e$$

Although the present invention has been described in terms of particular embodiments, it is not intended that the invention be limited to these embodiments. Modifications within the spirit of the invention will be apparent to those skilled in the art. In an alternate embodiment of the present invention, those skilled in the art would recognize that other optical quantum systems, such as "which path" qubits and time bin qubits, can be used in place of polarization states. For example, the input state generator 2102 can be used to generate randomly polarized photons, and the polarizing beamsplitter 2106 can be replaced by a 50:50 beamsplitter. In other words, the input state generator 2102 and a 50:50 splitter can be used to generate "which path" optical qubit systems. In addition, the system embodiments of the present invention can be modified to operate with time bin qubits. In an alternate embodiment of the present invention, rather than using pairs of photons in the Bell state $|\psi_+\rangle$ in the QRNG 1100, in FIG. 11, pairs of photons in any one of the Bell states:

$$|\psi_-\rangle = \frac{1}{\sqrt{2}}(|H_1V_2\rangle - |V_1H_2\rangle),$$

$$|\phi_+\rangle = \frac{1}{\sqrt{2}}(|H_1H_2\rangle + |V_1V_2\rangle), \text{ and}$$

Figure 23:
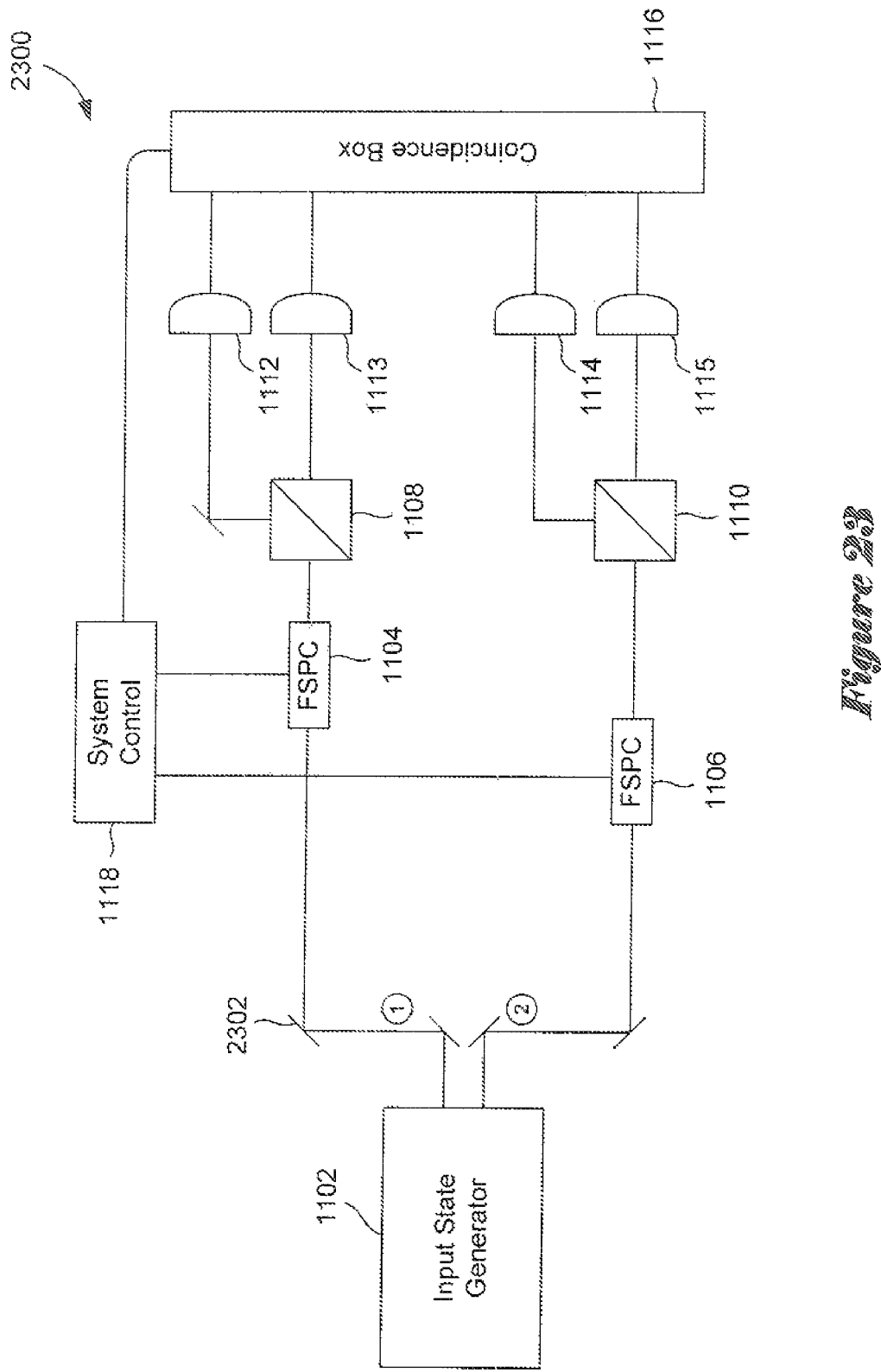
FIG. 23 illustrates an optical-based quantum random number generator that uses optical beams and mirrors that represents an embodiment of the present invention

-continued $$|\phi_-\rangle = \frac{1}{\sqrt{2}}(|H_1 H_2\rangle - |V_1 V_2\rangle)$$

can also be used. The coincidence box 1116 can be reconfigured so that photons generated in any one of the Bell states can be used to generate sequences of random binary numbers. In an alternate embodiment of the present invention, the optical fibers employed to implement the QRNG 1100, in FIG. 11, and the QRNG 2100, in FIG. 21, can be replaced with optical beams directed by mirrors. For example, FIG. 23 illustrates an optical-based QRNG 2300 that uses optical beams and mirrors and that represents an embodiment of the present invention. In FIG. 23, the QRNG 2300 uses mirrors, such as mirror 2302, to direct photon beams of electromagnetic radiation output from the input state generator 1102.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

Appendix

Theorem 1. The min-entropy of a system described by a density matrix $\hat{\rho}_S$ is:

$$H_{Min}(\hat{\rho}_S) = f(\hat{\rho}_S)$$

In order to demonstrate a proof of the Theorem 1, proofs of the followings three Lemmas are demonstrated.

Lemma 1. For each pure state $|\psi\rangle$:

$$H_{Min}(|\psi\rangle\langle\psi|) = f(|\psi\rangle\langle\psi|)$$

Proof of Lemma 1 is demonstrated by showing that:

$$\max(Pr_{HV}, 1 - Pr_{HV}) = \frac{1 + \sqrt{1 - |S_1 + iS_2|^2}}{2}$$

for the cases $Pr_{HV} > \frac{1}{2}$, $Pr_{HV} < \frac{1}{2}$, and $Pr_{HV} = \frac{1}{2}$. First, because $|\psi\rangle$ is a pure state, the associated Stokes parameters correspond to a point on the surface of a Poincare sphere, as described above with reference to FIG. 15, and, in particular, the parameters $S_1$ and $S_2$ are given by:

$$S_1 = \sqrt{4P_{HV}(1 - P_{HV})}\cos\theta$$

$$S_2 = \sqrt{4P_{HV}(1 - P_{HV})}\sin\theta$$

Substituting $S_1$ and $S_2$ into the right-hand side gives:

$$\frac{1 + \sqrt{1 - |S_1 + iS_2|^2}}{2} = \frac{1 + \sqrt{1 - 4Pr_{HV}(1 - Pr_{HV})}}{2}$$

$$= \frac{1}{2} + \left|\frac{1}{2} - Pr_{HV}\right|$$

When $Pr_{HV} > \frac{1}{2}$ the left-hand side reduces to $$\max(Pr_{HV}, 1 - Pr_{HV}) = Pr_{HV},$$

and the right-hand side reduces to $$\frac{1}{2} + \left|\frac{1}{2} - Pr_{HV}\right| = \frac{1}{2} + Pr_{HV} - \frac{1}{2} = Pr_{HV}$$

When $Pr_{HV} < \frac{1}{2}$ the left-hand side reduces to $$\max(Pr_{HV}, 1 - Pr_{HV}) = 1 - Pr_{HV}$$

and the right-hand side reduces to $$\frac{1}{2} + \left|\frac{1}{2} - Pr_{HV}\right| = \frac{1}{2} + \frac{1}{2} - Pr_{HV} = 1 - Pr_{HV}$$

Finally, for the trivial case, when $Pr_{HV} = \frac{1}{2}$, both the left and right hand side reduce to $\frac{1}{2}$.

Lemma 2. Two pure states $|\psi_1\rangle$ and $|\psi_2\rangle$ that are represented by the density matrices:

$$\hat{\rho}_1 = \frac{1}{2}\begin{bmatrix} 1 + S_3' & S_1 - iS_2 \\ S_1 + iS_2 & 1 - S_3' \end{bmatrix}, \text{ and}$$

$$\hat{\rho}_2 = \frac{1}{2}\begin{bmatrix} 1 - S_3' & S_1 - iS_2 \\ S_1 + iS_2 & 1 - S_3' \end{bmatrix}$$

with $S_3' = \sqrt{1 - S_1^2 - S_2^2}$ are a decomposition of the density matrix $$\hat{\rho}_S = \frac{1}{2}\begin{bmatrix} 1 + S_3 & S_1 - iS_2 \\ S_1 + iS_2 & 1 - S_3 \end{bmatrix}$$

Proof of Lemma 2: The density matrices represent pure states that are a decomposition of $\hat{\rho}_S$ with diagonal matrix elements that satisfy:

$$p_1 + p_2 = 1, \text{ and}$$

$$p_1 - p_2 = \frac{S_3}{S_3'}$$

Based on Lemma 1, since both $|\psi_1\rangle$ and $|\psi_2\rangle$ are pure states:

$$H_{Min}(|\psi_1\rangle\langle\psi_1|) = f(\hat{\rho}_S) = H_{Min}(|\psi_2\rangle\langle\psi_2|)$$

In addition, based on the equation for $$H_{Min}\left(\left(\sum_i p_i |\psi_i\rangle\langle\psi_i|\right)^n\right)$$

above, with n=1:

$$H_{Min}(p_1|\psi_1\rangle\langle\psi_1| + p_2|\psi_2\rangle\langle\psi_2|) = p_1 H_{Min}(|\psi_1\rangle\langle\psi_1|) +$$
$$= p_2 H_{Min}(|\psi_2\rangle\langle\psi_2|)$$
$$= (p_1 + p_2) f(\hat{\rho}_S)$$
$$= f(\hat{\rho}_S)$$

Lemma 3. The function $f(\hat{\rho}_S)$ is a convex function of the Stokes parameters $S_1, S_2, S_3$ on the Poincare sphere.

Proof of Lemma 2: The eigenvalues of the Hessian matrix of $f(\hat{\rho}_S)$ are non-negative over the domain (½,1).

Proof of the Theorem. According to properties of a convex function:

$$f(\hat{\rho}_S) \le \sum_i p_i f(|\psi_i\rangle\langle\psi_i|)$$

for each decomposition of $\hat{\rho}_S$. Substituting the result of Lemma 1 and using equation $$H_{Min}\left(\left(\sum_i p_i |\psi_i\rangle\langle\psi_i|\right)^n\right)$$

above gives:

$$f(\hat{\rho}_S) \le H_{Min}\left(\sum_i p_i |\psi_i\rangle\langle\psi_i|\right)$$

Which means that $f(\hat{\rho}_S)$ is a lower bound for the min-entropy of $\hat{\rho}_S$. But according to Lemma 2, there is at least one decomposition of $\hat{\rho}_S$ for which $$f(\hat{\rho}_S) = H_{Min}(\hat{\rho}_S)$$

Therefore, $f(\hat{\rho}_S)$ is equal to the minimum of $H_{Min}$ over all the decompositions of $\hat{\rho}_S$. Q.E.D.

What is claimed is:

1. An optical-based self-authenticating system for generating a sequence of random numbers, the system comprising:
    an input state generator that generates a first optical quantum system and a second optical quantum system in an entangled state;
    two or more detectors that measure the state of the first optical quantum system and the state of the second optical quantum system;
    a system control that evaluates a result obtained from measuring the state of the first optical quantum system and state of the second optical quantum system to determine whether or not to append a number associated with the result to the sequence of random numbers; and
    state controllers, located between the input state generator and the detector, that are operationally controlled by the system control to maintain the entangled state, based on results obtained from previous measurements performed on the first optical quantum system and the second optical quantum system.

2. The system of claim 1 further comprises variable losses operationally controlled by the system control for equating the probabilities associated with measuring the states in the entangled state.

3. The system of claim 1 wherein the first optical quantum system and the second optical quantum system further comprise one of:
    a pair of photons in an entangled polarization state;
    which path photons in an entangled state; and
    time bin photons in an entangled state.

4. The system of claim 3 wherein a first photon of the pair of photons is in a first polarization state and the second photon of the pair of photons is in a second polarization state orthogonal to the polarization state of the first photon.

5. The system of claim 1 wherein the input state generator comprises:
    a source for generating a pair of photons; and
    a state selector that processes the pair of photons such that the photons output from the state selector are in a Bell state.

6. The system of claim 1 further comprises a first channel for transmitting the first optical quantum system and a second channel for transmitting the second optical quantum system.

7. The system of claim 6 wherein the first channel and the second channel are any one of:
    optical fibers; and
    free space.

8. A optical-based self-authenticating system for generating a sequence of random numbers, the system comprising:
    an input state generator that generates a optical quantum system in a linear superposition of states;
    a detector that measures the state of the optical quantum system;
    a system control that evaluates a result obtained from measuring the state of the optical quantum system to determine whether or not to append a number associated with the result to the sequence of random numbers; and
    a state controller, located between the input state generator and the detector, that is operationally controlled by the system control in order to maintain the states of the optical quantum system, based on the results obtained from measuring the states of the optical quantum system.

9. The system of claim 1 wherein the state controller further comprises a fiber-squeezer-polarization controller for maintaining the polarization state of a polarized photon.

10. The system of claim 8 wherein the two or more detectors further comprise two or more photon detectors.

11. The system of claim 8 wherein the optical quantum system in the linear superposition of states is one of:
    a single photon in a linear superposition of polarized states;
    a pair of photons in a Bell state;
    which path photons;
    which path photons in an entangled state; and
    time bin photons; and
    time bin photons in an entangled state.

12. The system of claim 8 further comprises variable losses located between the input state generator and the detector that are operationally controlled by the system control for balancing the probability associated with measuring the states of the optical quantum system.

13. The system of claim 8 further comprises channels for transmitting the optical quantum system wherein the channels are one of:
   optical fibers; and
   free space.

14. The system of claim 8 wherein the state controller further comprises one or more fiber-squeezer-polarization controllers for maintaining the polarization state of the optical quantum system.

15. The system of claim 8 wherein the detector further comprises one or more photon detectors.

* * * * *